(12) United States Patent
Kubo et al.

(10) Patent No.: US 8,452,280 B2
(45) Date of Patent: May 28, 2013

(54) MOBILE RADIO TERMINAL

(75) Inventors: Yoshiyuki Kubo, Ome (JP); Naritoshi Saito, Hino (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 911 days.

(21) Appl. No.: 11/089,603

(22) Filed: Mar. 24, 2005

(65) Prior Publication Data

US 2006/0189312 A1 Aug. 24, 2006

(30) Foreign Application Priority Data

Feb. 23, 2005 (JP) ................................. 2005-047494

(51) Int. Cl.
*H04W 4/00* (2009.01)
(52) U.S. Cl.
USPC ...................... 455/434; 455/422.1; 455/432.1
(58) Field of Classification Search
USPC ...................................... 455/424–444, 422.1
See application file for complete search history.

(56) References Cited

U.S. PATENT DOCUMENTS

| | | | | |
|---|---|---|---|---|
| 5,627,882 A * | 5/1997 | Chien et al. | ................... | 455/464 |
| 5,794,146 A * | 8/1998 | Sevcik et al. | ................. | 455/434 |
| 5,799,256 A * | 8/1998 | Pombo et al. | ................. | 455/574 |
| 6,112,055 A * | 8/2000 | Bennett et al. | ............... | 340/7.34 |
| 6,119,003 A * | 9/2000 | Kukkohovi | ................ | 455/435.2 |
| 6,393,282 B1 * | 5/2002 | Iimori | ........................ | 455/432.1 |
| 6,807,163 B1 | 10/2004 | Shi | | |
| 7,085,569 B2 * | 8/2006 | Ohmori | ...................... | 455/435.2 |
| 2002/0082010 A1 * | 6/2002 | Koorapaty et al. | ........... | 455/434 |
| 2002/0177441 A1 * | 11/2002 | Ida et al. | ........................ | 455/434 |
| 2004/0023634 A1 * | 2/2004 | Jeong et al. | ................... | 455/403 |
| 2004/0071119 A1 * | 4/2004 | Ishikawa et al. | .............. | 370/335 |
| 2004/0120278 A1 | 6/2004 | Krantz et al. | | |
| 2004/0203839 A1 * | 10/2004 | Ostberg et al. | ................ | 455/455 |

FOREIGN PATENT DOCUMENTS

| | | |
|---|---|---|
| EP | 0 627 836 A2 | 12/1994 |
| EP | 1 263 256 A2 | 12/2002 |
| JP | 08-046563 | 2/1996 |
| JP | 09-275587 | 10/1997 |
| JP | 2000-209630 A | 7/2000 |
| JP | 2000-278763 A | 10/2000 |
| JP | 2002-186009 A | 6/2002 |
| JP | 2002-354532 A | 12/2002 |
| JP | 2004-221671 A | 8/2004 |

OTHER PUBLICATIONS

European Search Report dated Nov. 19, 2008, issued in a counterpart European Application.

* cited by examiner

*Primary Examiner* — Ajit Patel
(74) *Attorney, Agent, or Firm* — Maschoff Brennan

(57) ABSTRACT

If a control unit detects that it is located outside the service area, searching for a base station on the basis of information stored in a first list storage area is conducted with a certain cycle by a first searching means and searching for a base station on the basis of information stored in a second list storage area is conducted in a gradually extended cycle, in accordance with the number of times Cs of searching for the base station, by a second searching means.

16 Claims, 15 Drawing Sheets

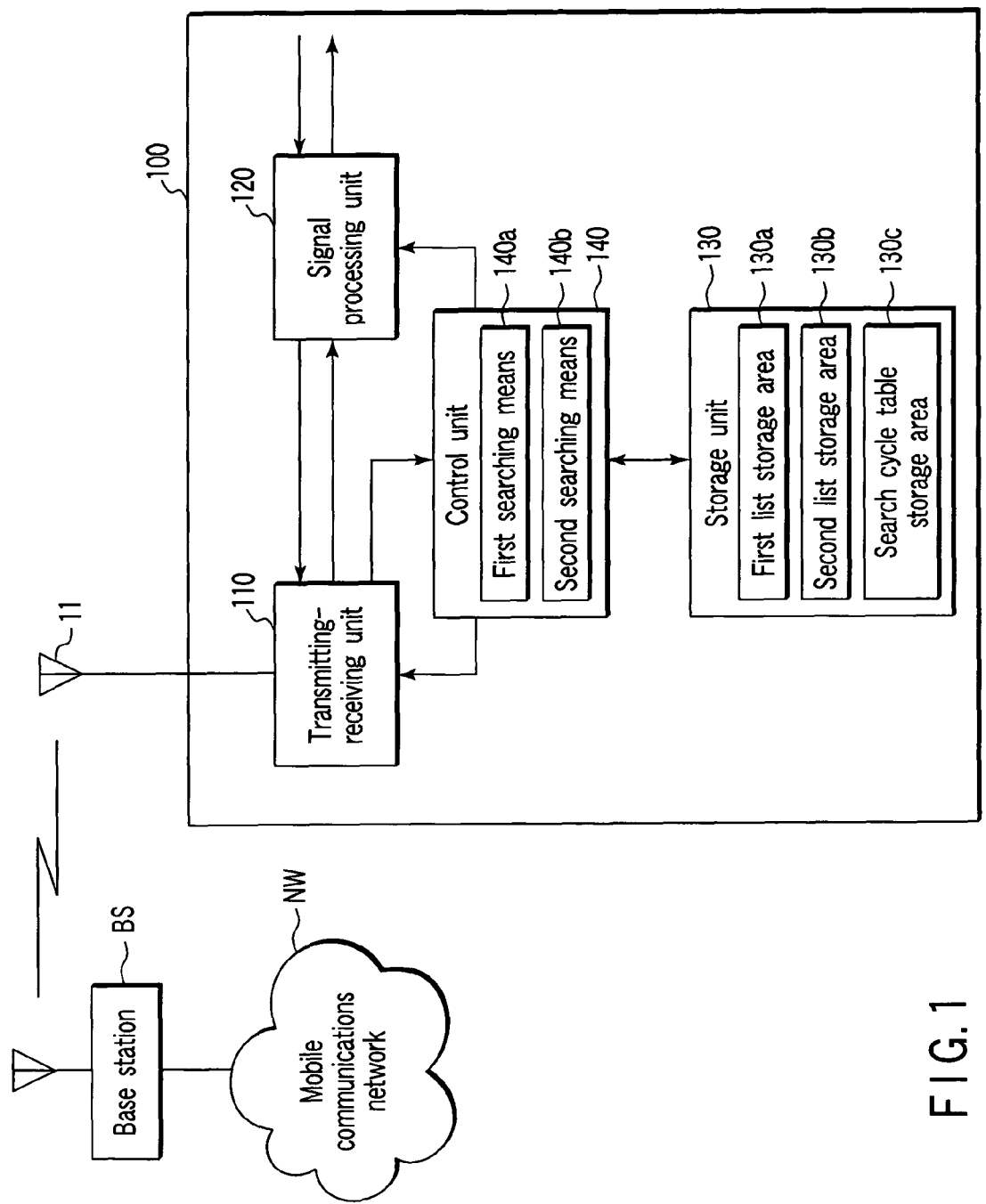
F I G. 1

| $C_S$ | T_List2 [min] |
|---|---|
| 0 | 3 |
| 1 | 5 |
| 2 | 10 |
| 3 | 15 |
| 4 | 30 |
| 5 or more | 30 |

FIG. 2

| Te [min] | T_List2 [min] |
|---|---|
| Te≦10 | 3 |
| 10<Te≦30 | 5 |
| 30<Te≦60 | 10 |
| 60<Te≦180 | 15 |
| Te>180 | 30 |

FIG. 6

| Te [min] | T_List1 [s] |
|---|---|
| Te≦10 | 10 |
| 10<Te≦60 | 20 |
| Te>60 | 30 |

FIG. 10

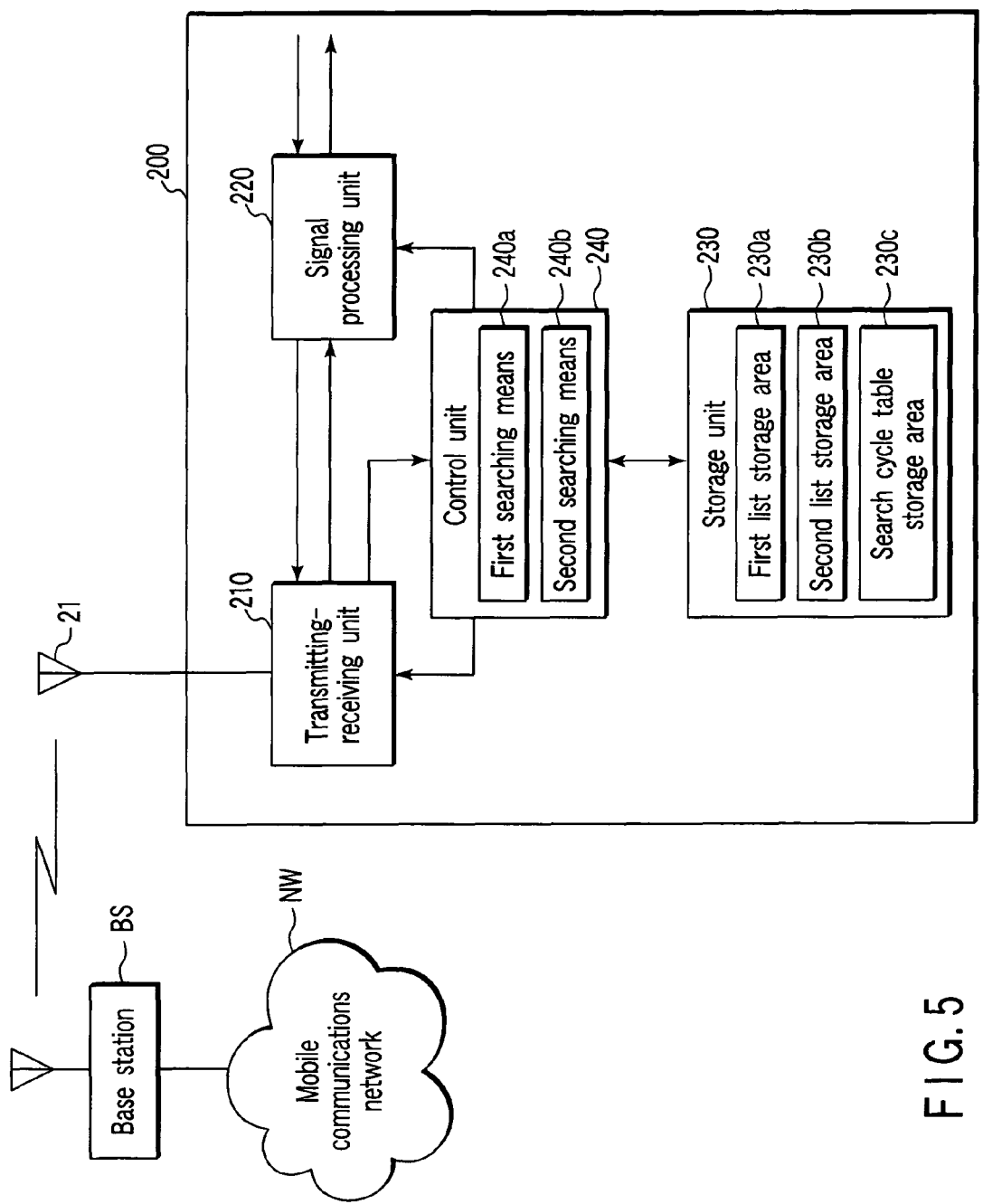
F I G. 5

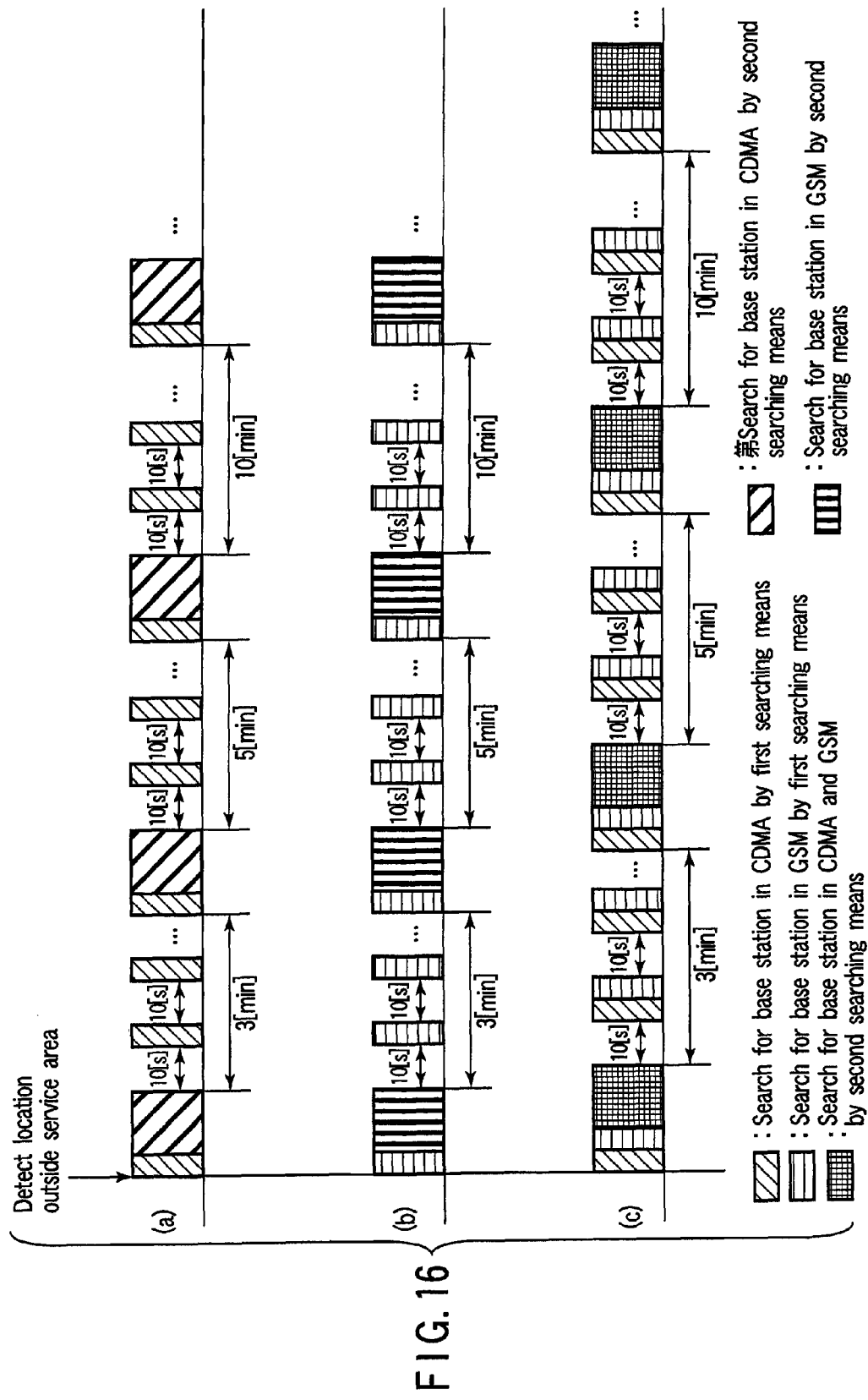
F I G. 16

MOBILE RADIO TERMINAL

CROSS-REFERENCE TO RELATED APPLICATIONS

This application is based upon and claims the benefit of priority from prior Japanese Patent Application No. 2005-047494, filed Feb. 23, 2005, the entire contents of which are incorporated herein by reference.

BACKGROUND OF THE INVENTION

1. Field of the Invention

This invention relates to a mobile radio terminal capable of employing different systems while moving, such as international roaming.

2. Description of the Related Art

A conventional mobile radio terminal, as is well known, classifies frequencies used for communications with a base station into a plurality of lists in accordance with possibilities of use of the frequencies and searches for available frequencies in order of the lists having higher possibilities of use thereof (see, for example, Jpn. Pat. Appln. KOKAI Publication No. 2002-354532).

Incidentally, if the conventional mobile radio terminal is located outside its service area for a long time, it searches for the frequencies on the basis of the lists including all of the frequencies (i.e. full-frequency search) and certainly detects the base station with which it can carries out communications, for example, in a cycle of about four hours.

In this conventional method, however, if the user of the mobile radio terminal moves overseas and attempts carrying out the international roaming within its service area, it takes, at longest, about four hours to detect the base station capable of carrying out communications.

If the mobile radio terminal fails to detect the base station for some reasons (for example, temporary shadowing or the like) by conducting the full-frequency search, the mobile radio terminal cannot detect the base station for more four hours.

To respond to this situation, shortening the cycle of conducting the full-frequency search can be conceived. However, the user may be located outside the service area for a long time before moving to a destination and the battery power may be wasted due by conducting unnecessary full-frequency search.

Thus, the cycle of searching for the base station capable of carrying out communications is fixed in the conventional mobile radio terminal. Therefore, if the mobile radio terminal is located outside the service area of, for example, the international roaming service, for a long time, the mobile radio terminal may be unable to detect the base station capable of carrying out communications for a long time or may waste the battery power.

BRIEF SUMMARY OF THE INVENTION

The present invention has been accomplished to solve the above-described problems. The object of the present invention is to provide a mobile radio terminal capable of detecting a base station which can carry out communications without wasting the battery power if it is located outside a service area of, for example, international roaming service, for a long time.

According to an aspect of the present invention, there is provided a mobile radio terminal. The mobile radio terminal comprises receiving means for receiving a radio signal transmitted from a radio base station, detecting means for detecting a condition of failing to carry out communications with the radio base station based on the reception result of the receiving means, searching means for searching for a radio base station capable of carrying out communications with the radio terminal, by controlling the receiving means if the detecting means detects the condition of failing to carry out communications, and search cycle varying means for varying a search frequency of the searching means, in accordance with the number of times of searching for the radio base station by the searching means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a structure of a mobile radio terminal according to a first embodiment of the present invention;

FIG. 2 is an illustration showing an example of a table stored in a search cycle table storage area of the mobile radio terminal shown in FIG. 1;

FIG. 5 is a block diagram showing a structure of a mobile radio terminal according to a second embodiment of the present invention;

FIG. 6 is an illustration showing an example of a table stored in a search cycle table storage area of the mobile radio terminal shown in FIG. 5;

FIG. 10 is an illustration showing an example of a table stored in a search cycle table storage area of the mobile radio terminal shown in FIG. 9;

FIG. 16 is an illustration showing an operation of searching for a base station of CDMA scheme and a base station of GSM scheme, separately.

DETAILED DESCRIPTION OF THE INVENTION

Figure 3:
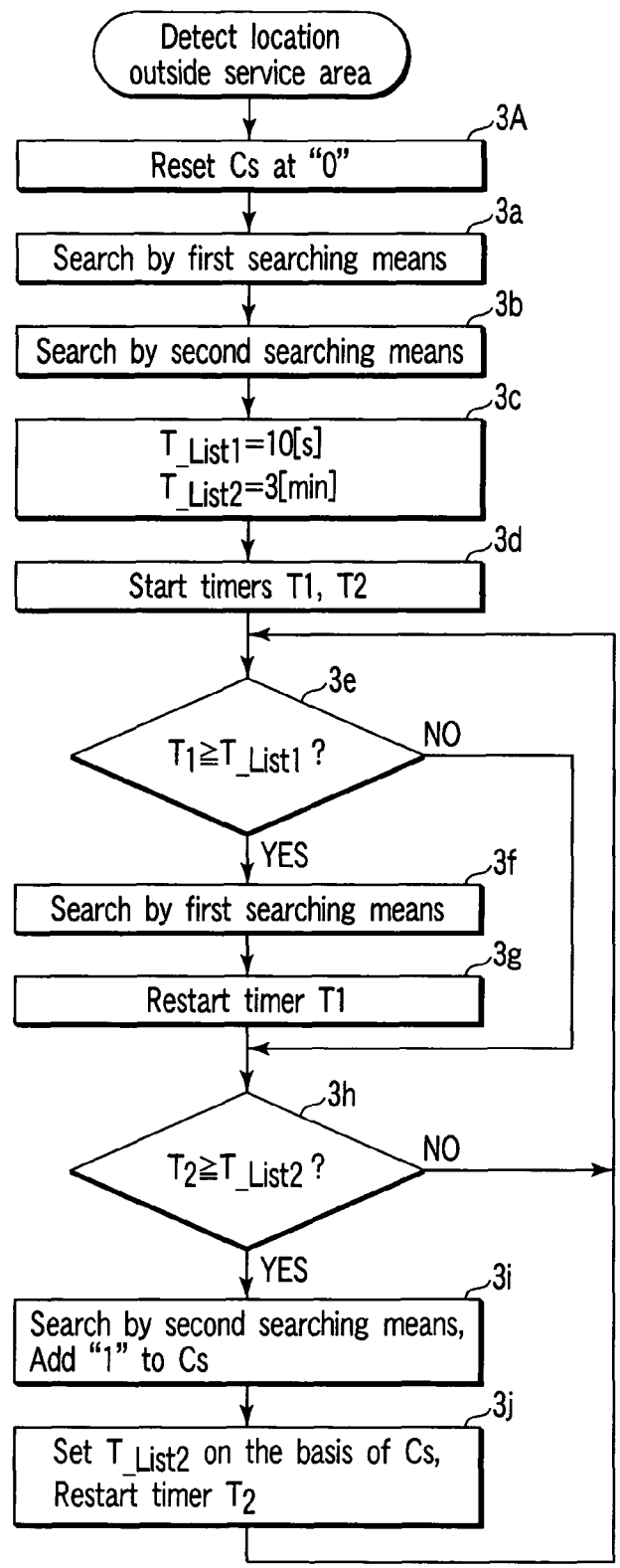
FIG. 3 is a flowchart showing an operation of searching for a base station which can carry out communications, by the mobile radio terminal shown in FIG. 1.

Embodiments of the present invention will be explained below with reference to the accompanying drawings.

FIG. 1 shows a structure of a mobile radio terminal 100 according to a first embodiment of the present invention. The mobile radio terminal 100 comprises an antenna 11, a transmitting-receiving unit 110, a signal processing unit 120, a storage unit 130 and a control unit 140.

The antenna 11 receives a radio signal transmitted from a base station BS accommodated in a mobile communications network NW or emits a radio signal. The mobile communications network NW and the base station BS are constituent elements of the mobile communications system. FIG. 1 shows one base station BS alone for convenience. Actually, a number of base stations are accommodated in the mobile communications network NW.

The mobile communications system forms a number of radio zones. At least one base station BS is arranged in each of the radio zones. Different frequencies are assigned to adjacent radio zones. The base station BS carries out radio communications using the assigned frequency with the mobile radio terminal 100.

The transmitting-receiving unit 110 is a radio communications unit which can be applied to both a W-CDMA (Wideband Code Division Multiple Access) system and a GSM (Global System for Mobile Communications) system. The transmitting-receiving unit 110 carries out radio communications with the base station BS via the antenna 11, and upconverts a transmit signal input from the signal processing unit 120 into a radio signal of a frequency designated by the control unit 140 described below.

In addition, the transmitting-receiving unit 110 downconverts the radio signal of the frequency designated by the control unit 140, of the radio signals received from the base station BS, and outputs the signal to the signal processing unit 120 as a receive signal.

The signal processing unit 120 can be applied to both the W-CDMA system and the GSM system. The signal processing unit 120 encodes a speech signal input from a microphone (not shown) and modulates a carrier wave signal on the basis of the encoding result to generate the transmit signal. In addition, the signal processing unit 120 demodulates the receive signal input from the transmitting-receiving unit 110 and decodes the demodulation result to obtain the speech signal. The speech signal is output from a loudspeaker (not shown).

The storage unit 130 comprises a first list storage area 130a, a second list storage area 130b and a search cycle table storage area 130c as areas in which a control program and control data of the control unit 140, and information to identify the frequencies are stored. The storage unit 130 stores values of a first search cycle T_List1, a second search cycle T_List2, and a search counter Cs.

In the first list storage area 130a, information items to identify frequencies corresponding to a channel which has been employed for an incoming call standby and a channel which has been employed for communications are stored. These information items are updated by the control unit 140 in accordance with the operations of the mobile radio terminal.

In the second list storage area 130b, information items to identify all of the frequencies with which the mobile radio terminal 100 can carry out communications are stored. In the present embodiment, since the mobile radio terminal 100 is applicable to the W-CDMA system and the GSM system, information items to identify one thousand or more of frequencies are stored in the second list storage area 130b.

In the search cycle table storage area 130c, for example, a search cycle table as shown in FIG. 2 is stored. In this search cycle table, number of times Cs of searching for the base station BS based on the information items stored in the second list storage area 130b corresponds to the second search cycle T_List2 to search for the base station BS.

The control unit 140 controls all of the units in the mobile radio terminal 100. The control unit 140 comprises a control function of implementing speech and data communications in the W-CDMA system and the GSM system. The control unit 140 also comprises a timer function, first searching means 140a and second searching means 140b as control functions of searching for the base station BS capable of carrying out communications.

The first searching means 140a is a control function of searching for the base station BS capable of carrying out communications, on the basis of the information items stored in the first list storage area 130a. The second searching means 140b is a control function of searching for the base station BS capable of carrying out communications, on the basis of the information items stored in the second list storage area 130b.

Searching for the base station BS is conducted by varying receive frequencies of the first searching means 140a, the second searching means 140b and the transmitting-receiving unit 110 and detecting a pilot signal transmitted from the base station BS over a predetermined channel.

Next, an operation of the mobile radio terminal 100 having the above-described structure is described. In the following descriptions, a general communications operation employing the base station BS is omitted, and an operation of base station search to be carried out in a case where the control unit 140 detects that the mobile radio terminal 100 is located outside the service area is explained.

FIG. 3 is a flowchart showing the control operation of searching for the base station by the control unit 140. The control program and the control data on which the flowchart is based are prestored in the storage unit 130.

First, the control unit 140 resets the search counter Cs at "0" in step 3A and proceeds to step 3a.

In step 3a, the control unit 140 starts up necessary units such as the transmitting-receiving unit 110 (WAKE-UP) and executes searching for the base station BS capable of carrying out communications, by employing the first searching means 140a. The first searching means 140a thereby controls the receive frequencies of the transmitting-receiving unit 110 and searches for the base station BS capable of carrying out communications, on the basis of the information items stored in the first list storage area 130a.

If the control unit 140 successfully detects the base station BS capable of carrying out communications, it ends the searching, registers a position of the mobile radio terminal 100 by the base station BS and stands by the incoming call.

On the other hand, if the control unit 140 fails to detect the base station BS capable of carrying out communications, it proceeds to step 3b.

In step 3b, the control unit 140 executes searching for the base station BS capable of carrying out communications, by employing the second searching means 140b. The second searching means 140b thereby controls the receive frequencies of the transmitting-receiving unit 110 and searches for the base station BS capable of carrying out communications, on the basis of the information items stored in the second list storage area 130b.

If the control unit 140 successfully detects the base station BS capable of carrying out communications, it ends the searching, registers a position of the mobile radio terminal 100 by the base station BS and stands by the incoming call. In addition, the control unit 140 stores identification information of the detected base station BS in the first list storage area 130a. On the other hand, if the control unit 140 fails to detect the base station BS capable of carrying out communications, it stops the units which are started up such as the transmitting-receiving unit 110 (SLEEP) and proceeds to step 3c.

In step 3c, the control unit 140 sets 10 [s] as the first search cycle T_List1. In addition, the control unit 140 sets a value corresponding to the search counter Cs stored in the storage unit 130 as the second search cycle T_List2, by referring to the search cycle table stored in the search cycle table storage area 130c, and proceeds to step 3d. Since the search counter Cs is "0", 3 [min] are set here as the second search cycle T_List2.

In step 3d, the control unit 140 starts up timer T1 and timer T2 such that each of the timers starts measuring the time. The control unit 140 proceeds to step 3e.

In step 3e, the control unit 140 discriminates whether the value of the timer T1 has passed the first search cycle T_List1. If the value of the timer T1 has passed the first search cycle T_List1, the control unit 140 proceeds to step 3f. If the value of the timer T1 has not passed the first search cycle T_List1, the control unit 140 proceeds to step 3h.

In step 3f, the control unit 140 starts up necessary units such as the transmitting-receiving unit 110 (WAKE-UP) and executes searching for the base station BS capable of carrying out communications, by employing the first searching means 140a. The first searching means 140a thereby controls the receive frequencies of the transmitting-receiving unit 110 and searches for the base station BS capable of carrying out communications, on the basis of the information items stored in the first list storage area 130a.

If the control unit 140 successfully detects the base station BS capable of carrying out communications, it ends the searching, registers a position of the mobile radio terminal 100 by the base station BS and stands by the incoming call. On the other hand, if the control unit 140 fails to detect the base station BS capable of carrying out communications, it stops the units which are started up such as the transmitting-receiving unit 110 (SLEEP) and proceeds to step 3g.

The control unit 140 restarts the timer T1 in step 3g and proceeds to step 3h.

In step 3h, the control unit 140 discriminates whether the value of the timer T2 has passed the second search cycle T_List2. If the value of the timer T2 has passed the second search cycle T_List2, the control unit 140 proceeds to step 3i. If the value of the timer T2 has not passed the second search cycle T_List2, the control unit 140 proceeds to step 3e.

In step 3i, the control unit 140 starts up necessary units such as the transmitting-receiving unit 110 (WAKE-UP) and executes searching for the base station BS capable of carrying out communications, by employing the second searching means 140b, after updating the value of the search counter Cs stored in the storage unit 130 by adding "1" to the value. The second searching means 140b thereby controls the receive frequencies of the transmitting-receiving unit 110 and searches for the base station BS capable of carrying out communications, on the basis of the information items stored in the second list storage area 130b.

If the control unit 140 successfully detects the base station BS capable of carrying out communications, it ends the searching, registers a position of the mobile radio terminal 100 by the base station BS and stands by the incoming call. In addition, the control unit 140 stores identification information of the detected base station BS in the first list storage area 130a. On the other hand, if the control unit 140 fails to detect the base station BS capable of carrying out communications, it stops the units which are started up such as the transmitting-receiving unit 110 (SLEEP) and proceeds to step 3j.

In step 3j, the control unit 140 sets a value corresponding to the search counter Cs stored in the storage unit 130 as the second search cycle T_List2, by referring to the search cycle table stored in the search cycle table storage area 130c.

In addition, the control unit 140 restarts the timer T2 and proceeds to step 3e. A search cycle corresponding to the number of times Cs of searching for the base station BS based on the information items stored in the second list storage area 130b is thereby set as the second search cycle T_List2.

Figure 4:
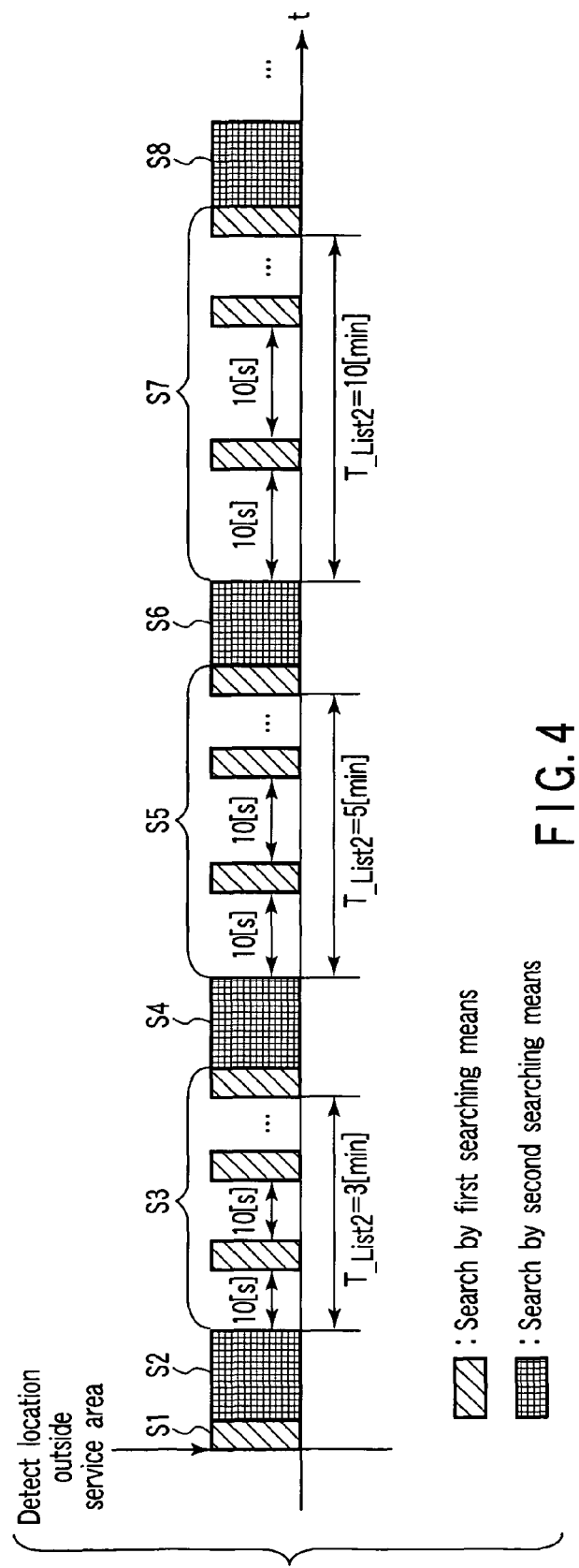
FIG. 4 is an illustration showing the operation of searching for the base station which can carry out communications, by the mobile radio terminal shown in FIG. 1.

Next, variation in the cycle of searching the base station BS by the control operation of the base station search is described. FIG. 4 is an illustration showing the variation in the search cycle. If the base station BS is detected, the processing of searching is ended. Therefore, FIG. 4 illustrates a case where a condition of failing to detect the base station BS is continued, for clear explanation.

First, if the control unit 140 detects that the mobile radio terminal 140 is located outside the service area, search S1 (step 3a) of the first searching means 140a and search S2 (step 3b) of the second searching means 140b are continued.

When the search S2 of the second searching means 140b is ended, search S3 (step 3f) of the first searching means 140a is repeated for every first search cycle T_List1 (=10 [s]).

When the second search cycle T_List2 (=3 [min]) elapses after the search S2 of the second searching means 140b is ended, search S4 (step 3i) of the second searching means 140b is executed.

When the search S4 of the second searching means 140b is ended, search S5 (step 3f) of the first searching means 140a is repeated for every first search cycle T_List1 (=10 [s]).

When the second search cycle T_List2 (=5 [min]) elapses after the search S4 of the second searching means 140b is ended, search S6 (step 3i) of the second searching means 140b is executed.

When the search S6 of the second searching means 140b is ended, search S7 (step 3f) of the first searching means 140a is repeated for every first search cycle T_List1 (=1 [s]).

When the second search cycle T_List2 (=1 [min]) elapses after the search S6 of the second searching means 140b is ended, search S8 (step 3i) of the second searching means 140b is executed.

As described above, if the control unit 140 detects that the mobile radio terminal 100 having the above-described structure is located outside the service area, searching for the base station BS on the basis of the information items stored in the first list storage area 130a is executed in a certain cycle and searching for the base station BS on the basis of the information items stored in the second list storage area 130b is executed in accordance with the number of times Cs of searching for the base station BS, in a gradually extended cycle.

These steps are based on the fact that as the mobile radio terminal 100 is located outside the service area for a longer time, probability of its location within the service area is lowered. In other words, searching for the base station BS is executed with high frequency at the initial time of detecting that the mobile radio terminal 100 is located outside the service area. As the time elapses, searching for the base station BS is executed with low frequency.

Therefore, according to the mobile radio terminal 100, the base station BS capable of carrying out communications can be easily detected at the initial time when the mobile radio terminal 100 is located outside the service area. Since the power consumed to search for the base station BS can be reduced as the time elapses, searching can be executed with great efficiency.

Next, a mobile radio terminal 200 according to a second embodiment of the present invention is explained. FIG. 5 shows a structure of the mobile radio terminal 200. The mobile radio terminal 200 comprises an antenna 21, a transmitting-receiving unit 210, a signal processing unit 220, a storage unit 230 and a control unit 240.

The antenna 21 receives a radio signal transmitted from a base station BS accommodated in a mobile communications network NW or emits a radio signal. The mobile communications network NW and the base station BS are constituent elements of the mobile communications system. FIG. 5 shows one base station BS alone for convenience. Actually, a number of base stations are accommodated in the mobile communications network NW.

The mobile communications system forms a number of radio zones. At least one base station BS is arranged in each of the radio zones. Different frequencies are assigned to adjacent radio zones. The base station BS carries out radio communications using the assigned frequency with the mobile radio terminal 200.

The transmitting-receiving unit 210 is a radio communications unit which can be applied to both the W-CDMA system and the GSM system. The transmitting-receiving unit 210 carries out radio communications with the base station BS via the antenna 21, and upconverts a transmit signal input from the signal processing unit 220 into a radio signal of a frequency designated by the control unit 240 described below.

In addition, the transmitting-receiving unit 210 downconverts the radio signal of the frequency designated by the control unit 240, of the radio signals received from the base station BS, and outputs the signal to the signal processing unit 220 as a receive signal.

The signal processing unit 220 can be applied to both the W-CDMA system and the GSM system. The signal processing unit 220 encodes a speech signal input from a microphone (not shown) and modulates a carrier wave signal on the basis of the encoding result to generate the transmit signal. In addition, the signal processing unit 220 demodulates the receive signal input from the transmitting-receiving unit 210 and decodes the demodulation result to obtain the speech signal. The speech signal is output from a loudspeaker (not shown).

The storage unit 230 comprises a first list storage area 230a, a second list storage area 230b and a search cycle table storage area 230c as areas in which a control program and control data of the control unit 240, and information to identify the frequencies are stored. The storage unit 230 stores values of a first search cycle T_List1 and a second search cycle T_List2.

In the first list storage area 230a, information items to identify frequencies corresponding to a channel which has been employed for an incoming call standby and a channel which has been employed for communications are stored. These information items are updated by the control unit 240 in accordance with the operations of the mobile radio terminal.

In the second list storage area 230b, information items to identify all of the frequencies with which the mobile radio terminal 200 can carry out communications are stored. In the present embodiment, since the mobile radio terminal 200 is applicable to the W-CDMA system and the GSM system, information items to identify one thousand or more of frequencies are stored in the second list storage area 230b.

In the search cycle table storage area 230c, for example, a search cycle table as shown in FIG. 6 is stored. In this search cycle table, elapsing time Te after the mobile radio terminal 200 moves out of the service area corresponds to the second search cycle T_List2 to search for the base station BS.

The control unit 240 controls all of the units in the mobile radio terminal 200. The control unit 240 comprises a control function of implementing speech and data communications in the W-CDMA system and the GSM system. The control unit 240 also comprises a timer function, first searching means 240a and second searching means 240b as control functions of searching for the base station BS capable of carrying out communications.

The first searching means 240a is a control function of searching for the base station BS capable of carrying out communications, on the basis of the information items stored in the first list storage area 230a. The second searching means 240b is a control function of searching for the base station BS capable of carrying out communications, on the basis of the information items stored in the second list storage area 230b.

Searching for the base station BS is conducted by varying receive frequencies of the first searching means 240a, the second searching means 240b and the transmitting-receiving unit 210 and detecting a pilot signal transmitted from the base station BS over a predetermined channel.

Next, an operation of the mobile radio terminal 200 having the above-described structure is described. In the following descriptions, a general communications operation employing the base station BS is omitted, and an operation of base station search to be carried out in a case where the control unit 240 detects that the mobile radio terminal 200 is located outside the service area is explained.

Figure 7:
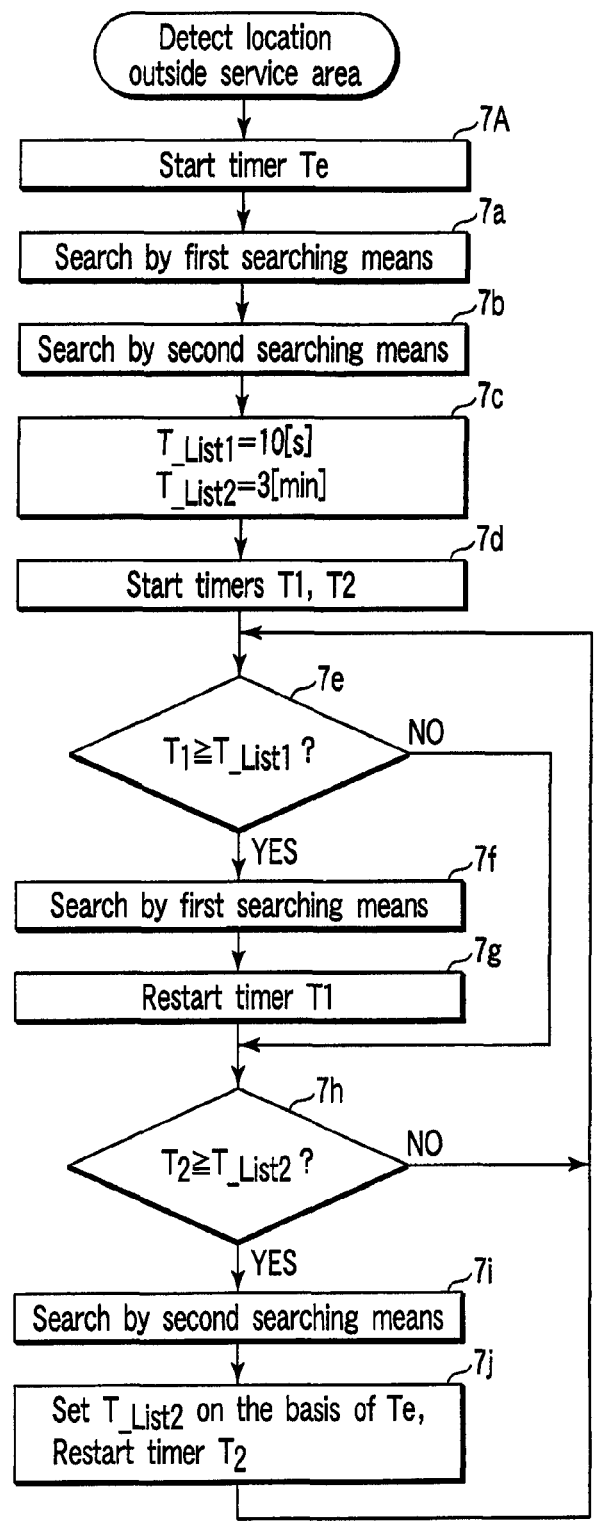
FIG. 7 is a flowchart showing an operation of searching for a base station which can carry out communications, by the mobile radio terminal shown in FIG. 5.

FIG. 7 is a flowchart showing the control operation of searching for the base station by the control unit 240. The control program and the control data on which the flowchart is based are prestored in the storage unit 230.

First, the control unit 240 starts up the timer Te to start measuring the time in step 7A and proceeds to step 7a. The timer Te indicates an elapsing time after the mobile radio terminal 200 moves out of the service area.

In step 7a, the control unit 240 starts up necessary units such as the transmitting-receiving unit 210 (WAKE-UP) and executes searching for the base station BS capable of carrying out communications, by employing the first searching means 240a. The first searching means 240a thereby controls the receive frequencies of the transmitting-receiving unit 210 and searches for the base station BS capable of carrying out communications, on the basis of the information items stored in the first list storage area 230a.

If the control unit 240 successfully detects the base station BS capable of carrying out communications, it ends the searching, registers a position of the mobile radio terminal 200 by the base station BS and stands by the incoming call.

On the other hand, if the control unit 240 fails to detect the base station BS capable of carrying out communications, it proceeds to step 7*b*.

In step 7*b*, the control unit 240 executes searching for the base station BS capable of carrying out communications, by employing the second searching means 240*b*. The second searching means 240*b* thereby controls the receive frequencies of the transmitting-receiving unit 210 and searches for the base station BS capable of carrying out communications, on the basis of the information items stored in the second list storage area 230*b*.

If the control unit 240 successfully detects the base station BS capable of carrying out communications, it ends the searching, registers a position of the mobile radio terminal 200 by the base station BS and stands by the incoming call. In addition, the control unit 240 stores identification information of the detected base station BS in the first list storage area 230*a*. On the other hand, if the control unit 240 fails to detect the base station BS capable of carrying out communications, it stops the units which are started up such as the transmitting-receiving unit 210 (SLEEP) and proceeds to step 7*c*.

In step 7*c*, the control unit 240 sets 10 [s] as the first search cycle T_List1 and 3 [min] as the second search cycle T_List2.

In step 7*d*, the control unit 240 starts up timer T1 and timer T2 such that each of the timers starts measuring the time. The control unit 240 proceeds to step 7*e*.

In step 7*e*, the control unit 240 discriminates whether the value of the timer T1 has passed the first search cycle T_List1. If the value of the timer T1 has passed the first search cycle T_List1, the control unit 240 proceeds to step 7*f*. If the value of the timer T1 has not passed the first search cycle T_List1, the control unit 240 proceeds to step 7*h*.

In step 7*f*, the control unit 240 starts up necessary units such as the transmitting-receiving unit 210 (WAKE-UP) and executes searching for the base station BS capable of carrying out communications, by employing the first searching means 240*a*. The first searching means 240*a* thereby controls the receive frequencies of the transmitting-receiving unit 210 and searches for the base station BS capable of carrying out communications, on the basis of the information items stored in the first list storage area 230*a*.

If the control unit 240 successfully detects the base station BS capable of carrying out communications, it ends the searching, registers a position of the mobile radio terminal 200 by the base station BS and stands by the incoming call. On the other hand, if the control unit 240 fails to detect the base station BS capable of carrying out communications, it stops the units which are started up such as the transmitting-receiving unit 210 (SLEEP) and proceeds to step 7*g*.

The control unit 240 restarts the timer T1 in step 7*g* and proceeds to step 7*h*.

In step 7*h*, the control unit 240 discriminates whether the value of the timer T2 has passed the second search cycle T_List2. If the value of the timer T2 has passed the second search cycle T_List2, the control unit 240 proceeds to step 7*i*. If the value of the timer T2 has not passed the second search cycle T_List2, the control unit 240 proceeds to step 7*e*.

In step 7*i*, the control unit 240 starts up necessary units such as the transmitting-receiving unit 210 (WAKE-UP) and executes searching for the base station BS capable of carrying out communications, by employing the second searching means 240*b*. The second searching means 240*b* thereby controls the receive frequencies of the transmitting-receiving unit 210 and searches for the base station BS capable of carrying out communications, on the basis of the information items stored in the second list storage area 230*b*.

If the control unit 240 successfully detects the base station BS capable of carrying out communications, it ends the searching, registers a position of the mobile radio terminal 200 by the base station BS and stands by the incoming call. In addition, the control unit 240 stores identification information of the detected base station BS in the first list storage area 230*a*. On the other hand, if the control unit 240 fails to detect the base station BS capable of carrying out communications, it stops the units which are started up such as the transmitting-receiving unit 210 (SLEEP) and proceeds to step 7*j*.

In step 7*j*, the control unit 240 sets a value corresponding to the elapsing time Te of the timer starting in step 7A as the second search cycle T_List2, by referring to the search cycle table stored in the search cycle table storage area 230*c*.

In addition, the control unit 240 restarts the timer T2 and proceeds to step 7*e*. A search cycle corresponding to the elapsing time Te after the mobile radio terminal 200 moves out of the service area, is thereby set as the second search cycle T_List2.

Figure 8:
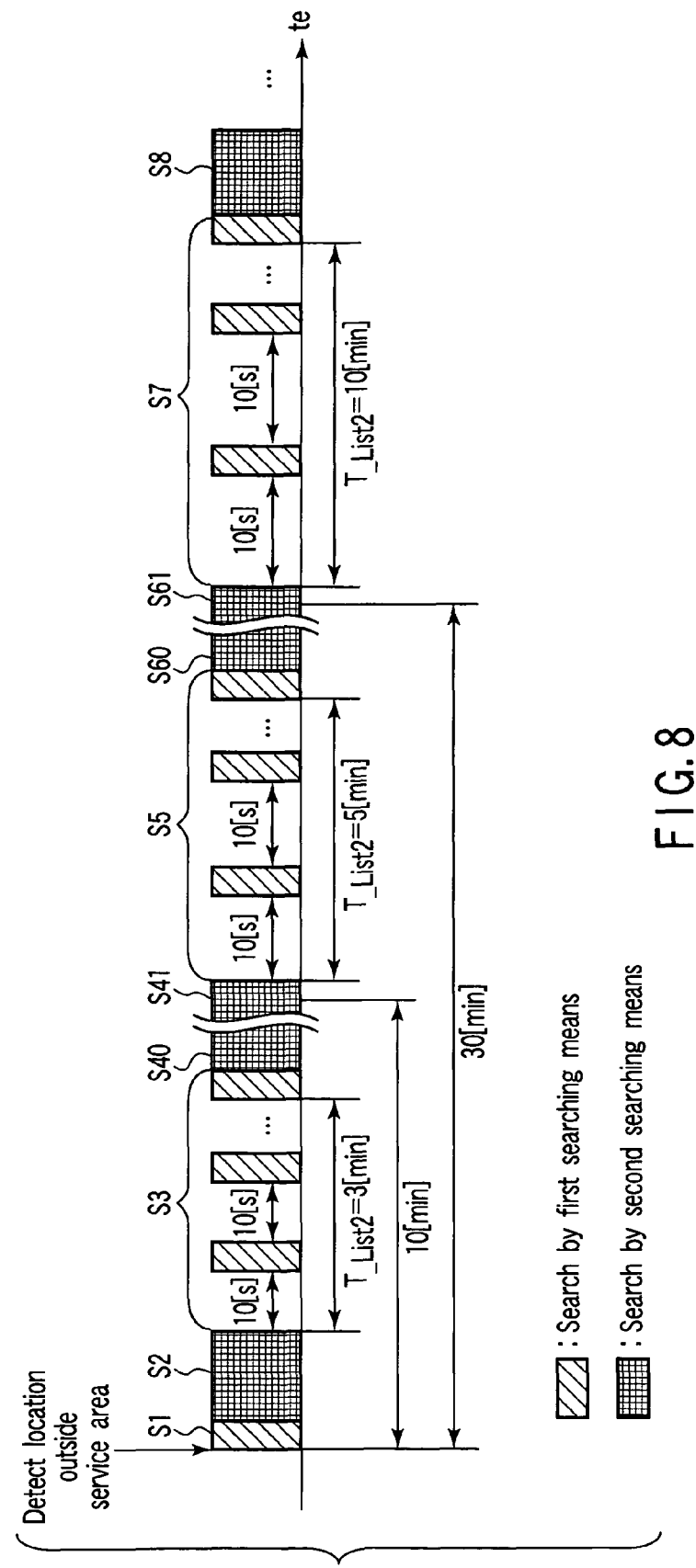
FIG. 8 is an illustration showing the operation of searching for the base station which can carry out communications, by the mobile radio terminal shown in FIG. 5.

Next, variation in the cycle of searching the base station BS by the control operation of the base station search is described. FIG. 8 is an illustration showing the variation in the search cycle. If the base station BS is detected, the processing of searching is ended. Therefore, FIG. 8 illustrates a case where a condition of failing to detect the base station BS is continued, for clear explanation.

First, if the control unit 240 detects that the mobile radio terminal 240 is located outside the service area, measuring the time by the timer Te is started (step 7A), and search S1 (step 7*a*) of the first searching means 240*a* and search S2 (step 7*b*) of the second searching means 240*b* are continued.

When the search S2 of the second searching means 240*b* is ended, search S3 (step 7*f*) of the first searching means 240*a* is repeated for every first search cycle T_List1 (=10 [s]).

When the second search cycle T_List2 (=3 [min]) elapses after the search S2 of the second searching means 240*b* is ended, search S40 (step 7*i*) of the second searching means 240*b* is executed.

After such a searching processing is repeated, if the elapsing time Te is longer than 10 [min] at the time when search S41 of the second searching means 240*b* has been ended, 5 [min] are set as the second search cycle T_List2 (step 7*j*).

After that, search S5 (step 7*f*) of the first searching means 240*a* is repeated for every first search cycle T_List1 (=10 [s]).

When the second search cycle T_List2 (=5 [min]) elapses after the search S41 of the second searching means 240*b* is ended, search S60 (step 7*i*) of the second searching means 240*b* is executed.

After such a searching processing is repeated, if the elapsing time Te is longer than 30 [min] at the time when search S61 of the second searching means 240*b* has been ended, 10 [min] are set as the second search cycle T_List2 (step 7*j*).

After that, search S7 (step 7*f*) of the first searching means 240*a* is repeated for every first search cycle T_List1 (=10 [s]).

When the second search cycle T_List2 (=10 [min]) elapses after the search S61 of the second searching means 240*b* is ended, search S8 (step 7*i*) of the second searching means 240*b* is executed.

As described above, if the control unit 240 detects that the mobile radio terminal 200 having the above-described structure is located outside the service area, searching for the base station BS on the basis of the information items stored in the first list storage area 230*a* is executed in a certain cycle and searching for the base station BS on the basis of the information items stored in the second list storage area 230*b* is executed, in a gradually extended cycle, in accordance with the elapsing time Te after the mobile radio terminal 200 moves out of the service area.

These steps are based on the fact that as the mobile radio terminal 200 is located outside the service area for a longer time, probability of its location within the service area is lowered. In other words, searching for the base station BS is executed with high frequency at the initial time of detecting that the mobile radio terminal 200 is located outside the service area. As the time elapses, searching for the base station BS is executed with low frequency.

Therefore, according to the mobile radio terminal 200, the base station BS capable of carrying out communications can be easily detected at the initial time when the mobile radio terminal 200 is located outside the service area. Since the power consumed to search for the base station BS can be reduced as the time elapses, searching can be executed with great efficiency.

Figure 9:
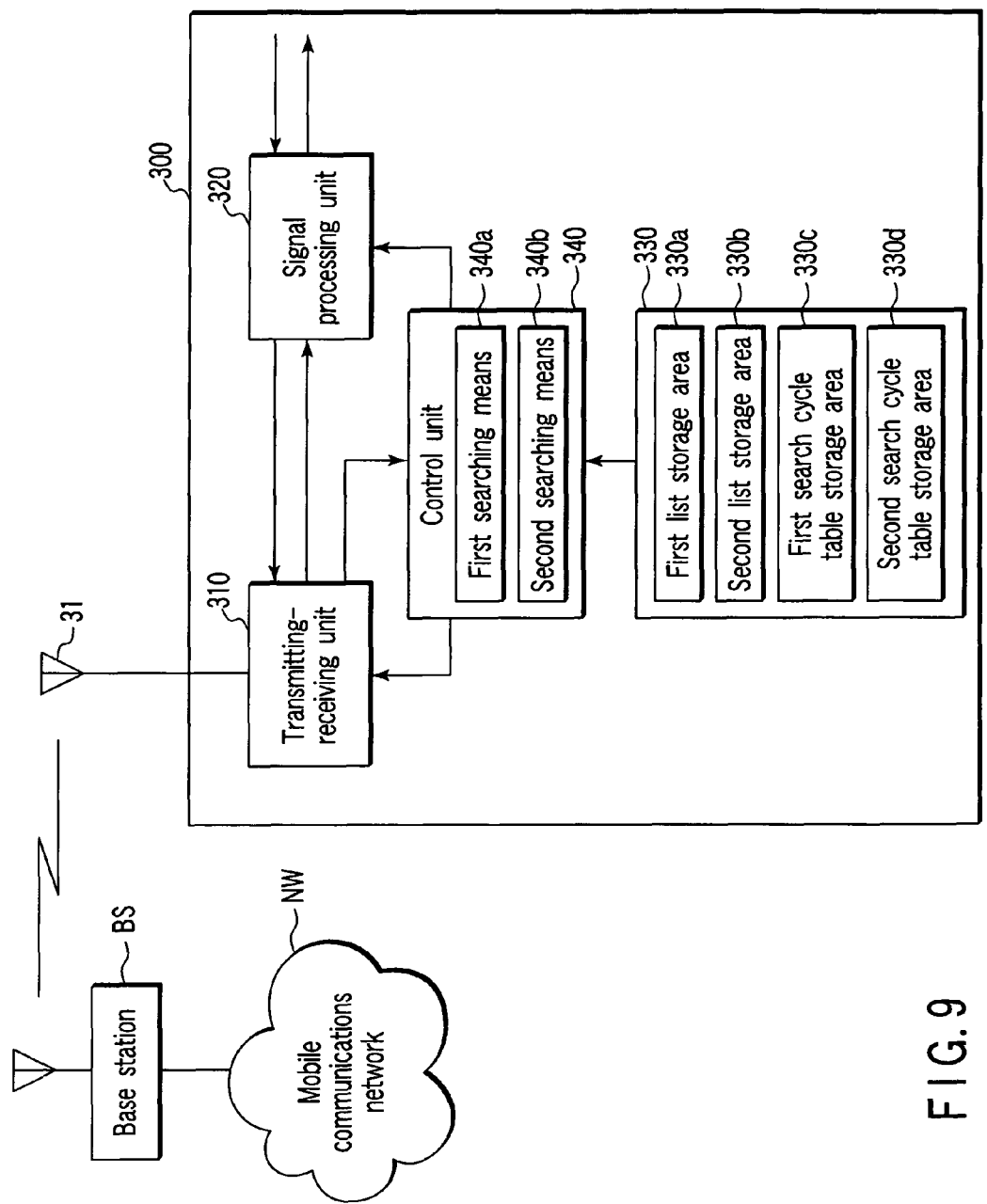
FIG. 9 is a block diagram showing a structure of a mobile radio terminal according to a third embodiment of the present invention.

Next, a mobile radio terminal 300 according to a third embodiment of the present invention is explained. FIG. 9 shows a structure of the mobile radio terminal 300. The mobile radio terminal 300 comprises an antenna 31, a transmitting-receiving unit 310, a signal processing unit 320, a storage unit 330 and a control unit 340.

The antenna 31 receives a radio signal transmitted from a base station BS accommodated in a mobile communications network NW or emits a radio signal. The mobile communications network NW and the base station BS are constituent elements of the mobile communications system. FIG. 9 shows one base station BS alone for convenience. Actually, a number of base stations are accommodated in the mobile communications network NW.

The mobile communications system forms a number of radio zones. At least one base station BS is arranged in each of the radio zones. Different frequencies are assigned to adjacent radio zones. The base station BS carries out radio communications using the assigned frequency with the mobile radio terminal 300.

The transmitting-receiving unit 310 is a radio communications unit which can be applied to both the W-CDMA system and the GSM system. The transmitting-receiving unit 310 carries out radio communications with the base station BS via the antenna 31, and upconverts a transmit signal input from the signal processing unit 320 into a radio signal of a frequency designated by the control unit 340 described below.

In addition, the transmitting-receiving unit 310 downconverts the radio signal of the frequency designated by the control unit 340, of the radio signals received from the base station BS, and outputs the signal to the signal processing unit 320 as a receive signal.

The signal processing unit 320 can be applied to both the W-CDMA system and the GSM system. The signal processing unit 320 encodes a speech signal input from a microphone (not shown) and modulates a carrier wave signal on the basis of the encoding result to generate the transmit signal. In addition, the signal processing unit 320 demodulates the receive signal input from the transmitting-receiving unit 310 and decodes the demodulation result to obtain the speech signal. The speech signal is output from a loudspeaker (not shown).

The storage unit 330 comprises a first list storage area 330a, a second list storage area 330b, a first search cycle table storage area 330c and a second search cycle table storage area 330d as areas in which a control program and control data of the control unit 340, and information to identify the frequencies are stored. The storage unit 330 stores values of a first search cycle T_List1 and a second search cycle T_List2.

In the first list storage area 330a, information items to identify frequencies corresponding to a channel which has been employed for an incoming call standby and a channel which has been employed for communications are stored. These information items are updated by the control unit 340 in accordance with the operations of the mobile radio terminal.

In the second list storage area 330b, information items to identify all of the frequencies with which the mobile radio terminal 300 can carry out communications are stored. In the present embodiment, since the mobile radio terminal 300 is applicable to the W-CDMA system and the GSM system, information items to identify one thousand or more of frequencies are stored in the second list storage area 330b.

In the first search cycle table storage area 330c, for example, a search cycle table as shown in FIG. 10 is stored. In this search cycle table, elapsing time Te after the mobile radio terminal 300 moves out of the service area corresponds to the first search cycle T_List1 to search for the base station BS.

In the second search cycle table storage area 330d, for example, a search cycle table as shown in FIG. 6 is stored. In this search cycle table, the elapsing time Te corresponds to the second search cycle T_List2 to search for the base station BS.

The control unit 340 controls all of the units in the mobile radio terminal 300. The control unit 340 comprises a control function of implementing speech and data communications in the W-CDMA system and the GSM system. The control unit 340 also comprises a timer function, first searching means 340a and second searching means 340b as control functions of searching for the base station BS capable of carrying out communications.

The first searching means 340a is a control function of searching for the base station BS capable of carrying out communications, on the basis of the information items stored in the first list storage area 330a. The second searching means 340b is a control function of searching for the base station BS capable of carrying out communications, on the basis of the information items stored in the second list storage area 330b.

Searching for the base station BS is conducted by varying receive frequencies of the first searching means 340a, the second searching means 340b and the transmitting-receiving unit 310 and detecting a pilot signal transmitted from the base station BS over a predetermined channel.

Next, an operation of the mobile radio terminal 300 having the above-described structure is described. In the following descriptions, a general communications operation employing the base station BS is omitted, and an operation of base station search to be carried out in a case where the control unit 340 detects that the mobile radio terminal 300 is located outside the service area is explained.

Figure 11:
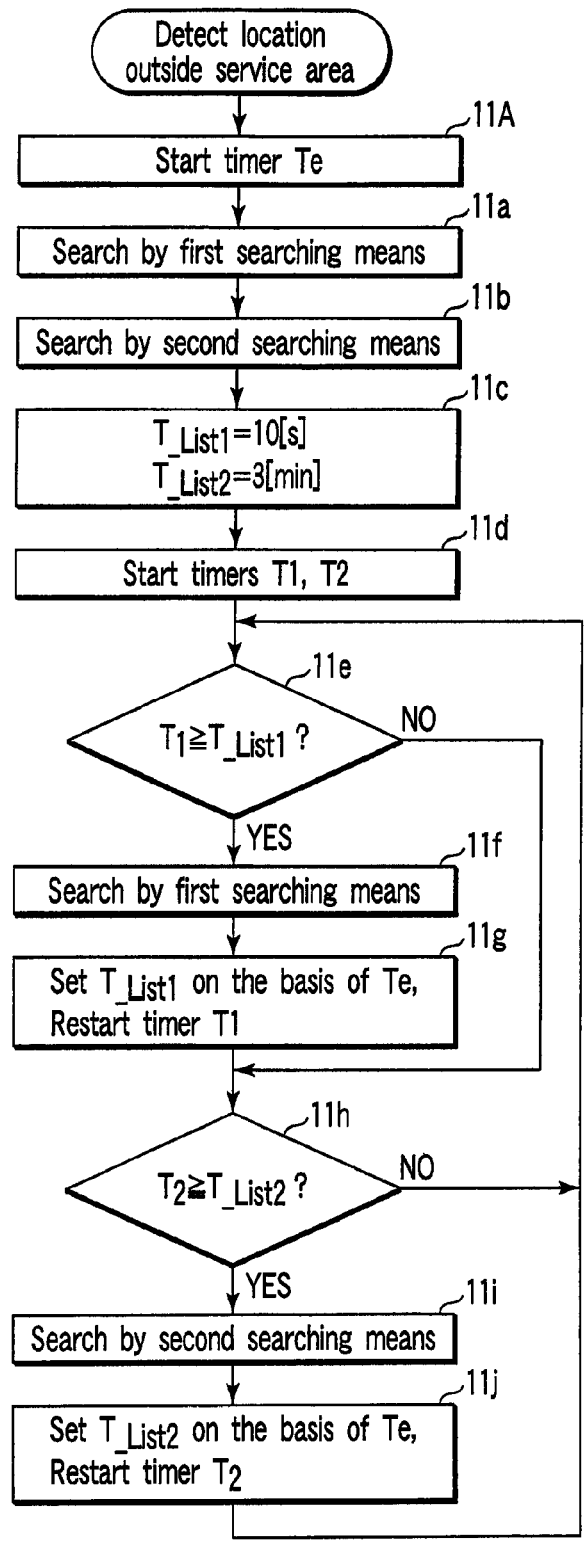
FIG. 11 is a flowchart showing an operation of searching for a base station which can carry out communications, by the mobile radio terminal shown in FIG. 9.

FIG. 11 is a flowchart showing the control operation of searching for the base station by the control unit 340. The control program and the control data on which the flowchart is based are prestored in the storage unit 330.

First, the control unit 340 starts up the timer Te to start measuring the time in step 11A and proceeds to step 11a. The timer Te indicates an elapsing time after the mobile radio terminal 300 moves out of the service area.

In step 11a, the control unit 340 starts up necessary units such as the transmitting-receiving unit 310 (WAKE-UP) and executes searching for the base station BS capable of carrying out communications, by employing the first searching means 340a. The first searching means 340a thereby controls the receive frequencies of the transmitting-receiving unit 310 and searches for the base station BS capable of carrying out communications, on the basis of the information items stored in the first list storage area 330a.

If the control unit 340 successfully detects the base station BS capable of carrying out communications, it ends the searching, registers a position of the mobile radio terminal 300 by the base station BS and stands by the incoming call. On the other hand, if the control unit 340 fails to detect the base station BS capable of carrying out communications, it proceeds to step 11b.

In step 11b, the control unit 340 executes searching for the base station BS capable of carrying out communications, by employing the second searching means 340b. The second searching means 340b thereby controls the receive frequencies of the transmitting-receiving unit 310 and searches for the base station BS capable of carrying out communications, on the basis of the information items stored in the second list storage area 330b.

If the control unit 340 successfully detects the base station BS capable of carrying out communications, it ends the searching, registers a position of the mobile radio terminal 300 by the base station BS and stands by the incoming call. In addition, the control unit 340 stores identification information of the detected base station BS in the first list storage area 330a. On the other hand, if the control unit 340 fails to detect the base station BS capable of carrying out communications, it stops the units which are started up such as the transmitting-receiving unit 310 (SLEEP) and proceeds to step 11c.

In step 11c, the control unit 340 sets 10 [s] as the first search cycle T_List1 and 3 [min] as the second search cycle T_List2.

In step 11d, the control unit 340 starts up timer T1 and timer T2 such that each of the timers starts measuring the time. The control unit 340 proceeds to step 11e.

In step 11e, the control unit 340 discriminates whether the value of the timer T1 has passed the first search cycle T_List1. If the value of the timer T1 has passed the first search cycle T_List1, the control unit 340 proceeds to step 11f. If the value of the timer T1 has not passed the first search cycle T_List1, the control unit 340 proceeds to step 11h.

In step 11f, the control unit 340 starts up necessary units such as the transmitting-receiving unit 310 (WAKE-UP) and executes searching for the base station BS capable of carrying out communications, by employing the first searching means 340a. The first searching means 340a thereby controls the receive frequencies of the transmitting-receiving unit 310 and searches for the base station BS capable of carrying out communications, on the basis of the information items stored in the first list storage area 330a.

If the control unit 340 successfully detects the base station BS capable of carrying out communications, it ends the searching, registers a position of the mobile radio terminal 300 by the base station BS and stands by the incoming call. On the other hand, if the control unit 340 fails to detect the base station BS capable of carrying out communications, it stops the units which are started up such as the transmitting-receiving unit 310 (SLEEP) and proceeds to step 11g.

In step 11g, the control unit 340 sets a value corresponding to the elapsing time Te of the timer starting in step 11A as the first search cycle T_List1, by referring to the search cycle table stored in the first search cycle table storage area 330c.

In addition, the control unit 340 restarts the timer T1 and proceeds to step 11h. A search cycle corresponding to the elapsing time Te after the mobile radio terminal 300 moves out of the service area is set as the first search cycle T_List1.

In step 11h, the control unit 340 discriminates whether the value of the timer T2 has passed the second search cycle T_List2. If the value of the timer T2 has passed the second search cycle T_List2, the control unit 340 proceeds to step 11i. If the value of the timer T2 has not passed the second search cycle T_List2, the control unit 340 proceeds to step 11e.

In step 11i, the control unit 340 starts up necessary units such as the transmitting-receiving unit 310 (WAKE-UP) and executes searching for the base station BS capable of carrying out communications, by employing the second searching means 340b. The second searching means 340b thereby controls the receive frequencies of the transmitting-receiving unit 310 and searches for the base station BS capable of carrying out communications, on the basis of the information items stored in the second list storage area 330b.

If the control unit 340 successfully detects the base station BS capable of carrying out communications, it ends the searching, registers a position of the mobile radio terminal 300 by the base station BS and stands by the incoming call. In addition, the control unit 340 stores identification information of the detected base station BS in the first list storage area 330a. On the other hand, if the control unit 340 fails to detect the base station BS capable of carrying out communications, it stops the units which are started up such as the transmitting-receiving unit 310 (SLEEP) and proceeds to step 11j.

In step 11j, the control unit 340 sets a value corresponding to the elapsing time Te of the timer starting in step 11A as the second search cycle T_List2, by referring to the search cycle table stored in the second search cycle table storage area 330d.

In addition, the control unit 340 restarts the timer T2 and proceeds to step 11e. A search cycle corresponding to the elapsing time Te after the mobile radio terminal 300 moves out of the service area, is thereby set as the second search cycle T_List2.

Figure 12:
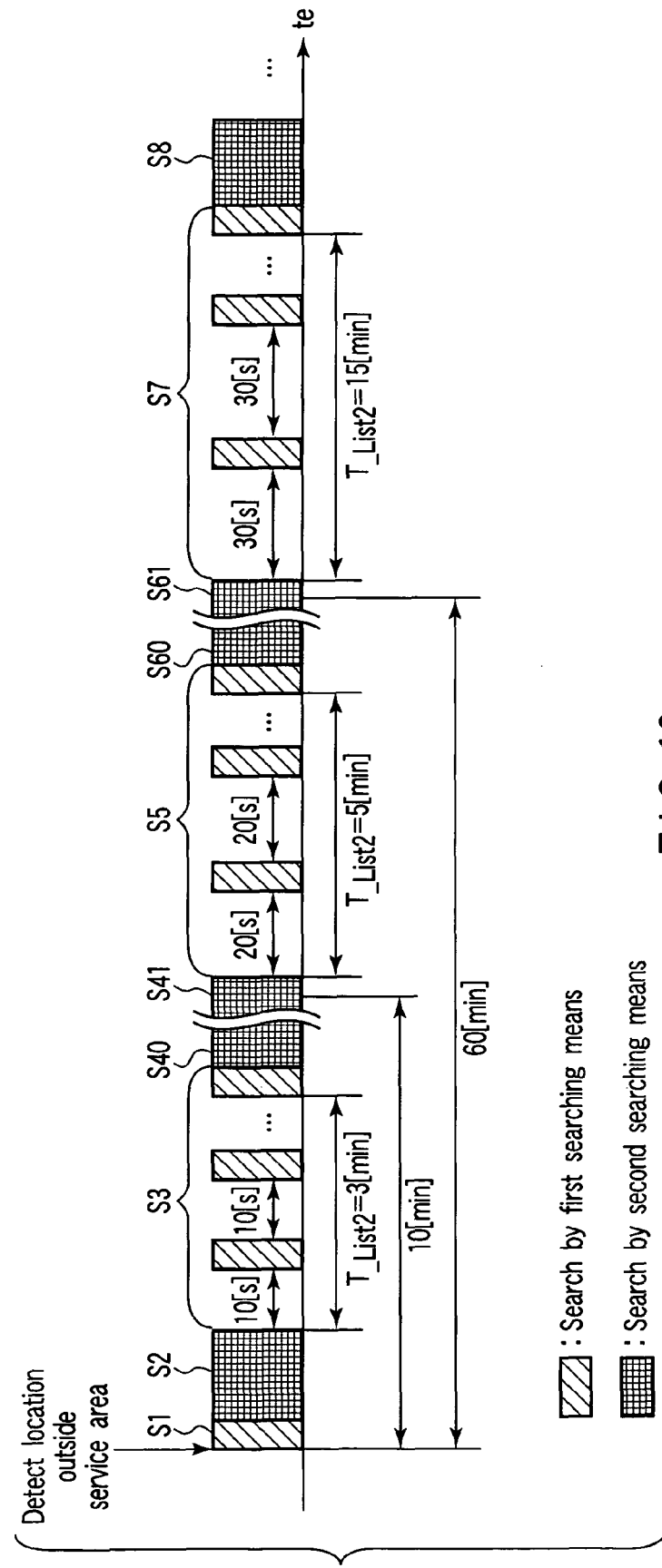
FIG. 12 is an illustration showing the operation of searching for the base station which can carry out communications, by the mobile radio terminal shown in FIG. 9.

Next, variation in the cycle of searching the base station BS by the control operation of the base station search is described. FIG. 12 is an illustration showing the variation in the search cycle. If the base station BS is detected, the processing of searching is ended. Therefore, FIG. 12 illustrates a case where a condition of failing to detect the base station BS is continued, for clear explanation.

First, if the control unit 340 detects that the mobile radio terminal 340 is located outside the service area, measuring the time by the timer Te is started (step 11A), and search S1 (step 11a) of the first searching means 340a and search S2 (step 11b) of the second searching means 340b are continued.

When the search S2 of the second searching means 340b is ended, search S3 (step 11f) of the first searching means 340a is repeated for every first search cycle T_List1 (=10 [s]).

When the second search cycle T_List2 (=3 [min]) elapses after the search S2 of the second searching means 340b is ended, search S40 (step 11i) of the second searching means 340b is executed.

After the searching processing is repeated, if the elapsing time Te is longer than 10 [min] at the time when search S41 of the second searching means 340b has been ended, 20 [s] are set as the first search cycle T_List1 (step 11g) and 5 [min] are set as the second search cycle T_List2 (step 11j).

After that, search S5 (step 11f) of the first searching means 340a is repeated for every first search cycle T_List1 (=20 [s]). When the second search cycle T_List2 (=5 [min]) elapses after the search S41 of the second searching means 340b is ended, search S60 (step 11i) of the second searching means 340b is executed.

After such a searching processing is repeated, if the elapsing time Te is longer than 30 [min], 10 [min] are set as the second search cycle T_List2 (step 11j). At this time, search S5 (step 11f) of the first searching means 340a is repeated for every first search cycle T_List1 (=20 [s]).

After such a searching processing is repeated, if the elapsing time Te is longer than 60 [min] at the time when search S61 of the second searching means 340b has been ended, 30 [s] are set as the first search cycle T_List1 (step 11g) and 15 [min] are set as the second search cycle T_List2 (step 11j).

After that, search S7 (step 11f) of the first searching means 340a is repeated for every first search cycle T_List1 (=30 [s]).

When the second search cycle T_List2 (=15 [min]) elapses after the search S61 of the second searching means 340b is ended, search S8 (step 11i) of the second searching means 340b is executed.

As described above, if the control unit 340 detects that the mobile radio terminal 300 having the above-described structure is located outside the service area, searching for the base station BS on the basis of the information items stored in the first list storage area 330a and searching for the base station BS on the basis of the information items stored in the second list storage area 330b, are executed, in a gradually extended cycle, in accordance with the elapsing time Te after the mobile radio terminal 300 moves out of the service area.

These steps are based on the fact that as the mobile radio terminal 300 is located outside the service area for a longer time, probability of its location within the service area is lowered. In other words, searching for the base station BS is executed with high frequency at the initial time of detecting that the mobile radio terminal 300 is located outside the service area. As the time elapses, searching for the base station BS is executed with low frequency.

Therefore, according to the mobile radio terminal 300, the base station BS capable of carrying out communications can be easily detected at the initial time when the mobile radio terminal 300 is located outside the service area. Since the power consumed to search for the base station BS can be reduced as the time elapses, searching can be executed with great efficiency.

Figure 13:
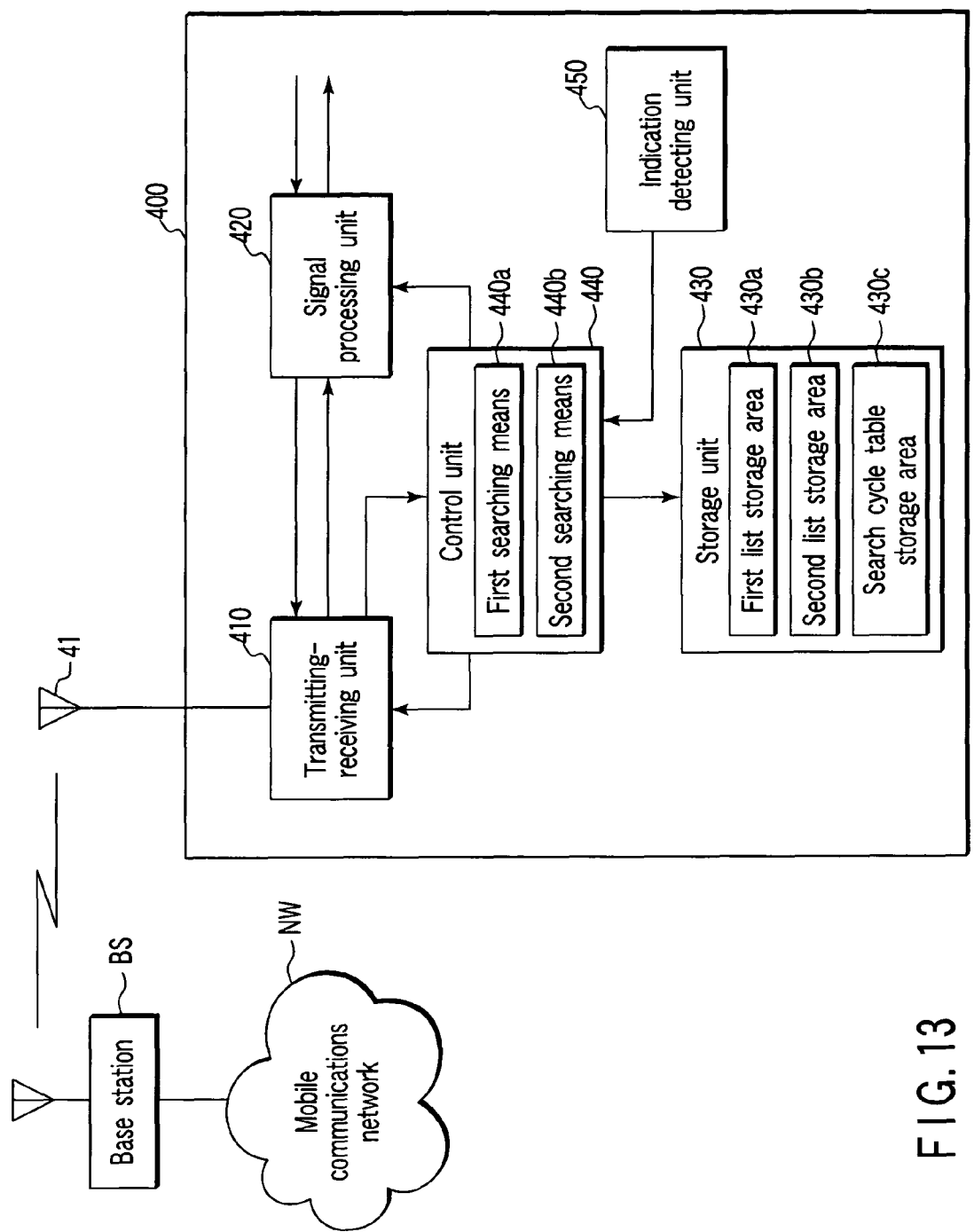
FIG. 13 is a block diagram showing a structure of a mobile radio terminal according to a fourth embodiment of the present invention.

Next, a mobile radio terminal 400 according to a fourth embodiment of the present invention is explained. FIG. 13 shows a structure of the mobile radio terminal 400 according to the fourth embodiment of the present invention. The mobile radio terminal 400 comprises an antenna 41, a transmitting-receiving unit 410, a signal processing unit 420, a storage unit 430, a control unit 440 and an indication detecting unit 450.

The antenna 41 receives a radio signal transmitted from a base station BS accommodated in a mobile communications network NW or emits a radio signal. The mobile communications network NW and the base station BS are constituent elements of the mobile communications system. FIG. 13 shows one base station BS alone for convenience. Actually, a number of base stations are accommodated in the mobile communications network NW.

The mobile communications system forms a number of radio zones. At least one base station BS is arranged in each of the radio zones. Different frequencies are assigned to adjacent radio zones. The base station BS carries out radio communications using the assigned frequency with the mobile radio terminal 400.

The transmitting-receiving unit 410 is a radio communications unit which can be applied to both the W-CDMA system and the GSM system. The transmitting-receiving unit 410 carries out radio communications with the base station BS via the antenna 41, and upconverts a transmit signal input from the signal processing unit 420 into a radio signal of a frequency designated by the control unit 440 described below.

In addition, the transmitting-receiving unit 410 downconverts the radio signal of the frequency designated by the control unit 440, of the radio signals received from the base station BS, and outputs the signal to the signal processing unit 420 as a receive signal.

The signal processing unit 420 can be applied to both the W-CDMA system and the GSM system. The signal processing unit 420 encodes a speech signal input from a microphone (not shown) and modulates a carrier wave signal on the basis of the encoding result to generate the transmit signal. In addition, the signal processing unit 420 demodulates the receive signal input from the transmitting-receiving unit 410 and decodes the demodulation result to obtain the speech signal. The speech signal is output from a loudspeaker (not shown).

The storage unit 430 comprises a first list storage area 430a, a second list storage area 430b and a search cycle table storage area 430c as areas in which a control program and control data of the control unit 440, and information to identify the frequencies are stored. The storage unit 430 stores values of a first search cycle T_List1, a second search cycle T_List2, a search counter Cs and an indication detection flag F.

In the first list storage area 430a, information items to identify frequencies corresponding to a channel which has been employed for an incoming call standby and a channel which has been employed for communications are stored. These information items are updated by the control unit 440 in accordance with the operations of the mobile radio terminal.

In the second list storage area 430b, information items to identify all of the frequencies with which the mobile radio terminal 400 can carry out communications are stored. In the present embodiment, since the mobile radio terminal 400 is applicable to the W-CDMA system and the GSM system, information items to identify one thousand or more of frequencies are stored in the second list storage area 430b.

In the search cycle table storage area 430c, for example, a search cycle table as shown in FIG. 2 is stored. In this search cycle table, number of times Cs of searching for the base station BS based on the information items stored in the second list storage area 430b corresponds to the second search cycle T_List2 to search for the base station BS.

The indication detecting unit 450 can be implemented by using, for example, an acceleration sensor. The indication detecting unit 450 detects an indication that the user is to use the mobile radio terminal 400, for example, by lifting the mobile radio terminal 400. A result of the detection is notified to the control unit 440.

The indication detecting unit 450 can also be implemented by a sensor other than an acceleration sensor. If a pressure sensor is used, the indication detecting unit 450 detects pressure applied to the surface of the mobile radio terminal 400 and thereby detects the indication of the user operation.

Otherwise, the indication detecting unit 450 may detect as the indication an operation of a key input unit (not shown) provided at the mobile radio terminal 400. In this case, the indication detecting unit 450 may detect the indication only when the operation about the communications functions such as speech communications, mails, Internet access and the like is conducted.

The control unit 440 controls all of the units in the mobile radio terminal 400. The control unit 440 comprises a control function of implementing speech and data communications in the W-CDMA system and the GSM system. The control unit 440 also comprises a timer function, first searching means 440a and second searching means 440b as control functions of searching for the base station BS capable of carrying out communications.

The first searching means 440*a* is a control function of searching for the base station BS capable of carrying out communications, on the basis of the information items stored in the first list storage area 430*a*. The second searching means 440*b* is a control function of searching for the base station BS capable of carrying out communications, on the basis of the information items stored in the second list storage area 430*b*.

Searching for the base station BS is conducted by varying receive frequencies of the first searching means 440*a*, the second searching means 440*b* and the transmitting-receiving unit 410 and detecting a pilot signal transmitted from the base station BS over a predetermined channel.

Next, an operation of the mobile radio terminal 400 having the above-described structure is described. In the following descriptions, a general communications operation employing the base station BS is omitted, and an operation of base station search to be carried out in a case where the control unit 440 detects that the mobile radio terminal 400 is located outside the service area is explained.

Figure 14:
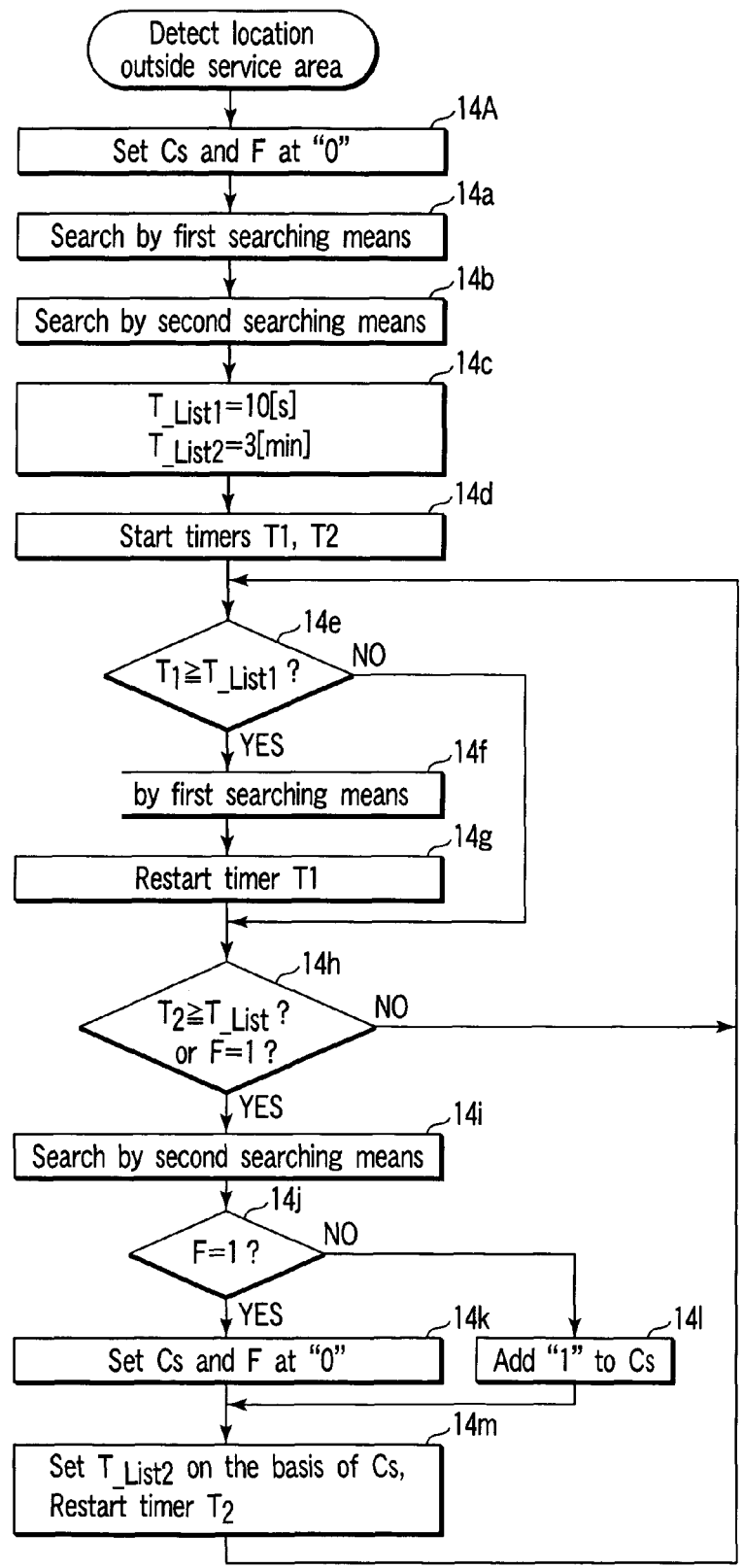
FIG. 14 is a flowchart showing an operation of searching for a base station which can carry out communications, by the mobile radio terminal shown in FIG. 13.

FIG. 14 is a flowchart showing the control operation of searching for the base station by the control unit 440. The control program and the control data on which the flowchart is based are prestored in the storage unit 430.

First, the control unit 440 resets the search counter Cs and the indication detection flag F at "0" and starts up the indication detecting unit 450 in step 14A. The control unit 440 proceeds to step 14*a*.

The indication detecting unit 450 thereby starts monitoring the user operation. If the indication detecting unit 450 detects the indication, the detection is notified to the control unit 440. The control unit 440 receiving the notification immediately sets the indication detection flag F at "1" in any one of steps described below.

In step 14*a*, the control unit 440 starts up necessary units such as the transmitting-receiving unit 410 (WAKE-UP) and executes searching for the base station BS capable of carrying out communications, by employing the first searching means 440*a*. The first searching means 440*a* thereby controls the receive frequencies of the transmitting-receiving unit 410 and searches for the base station BS capable of carrying out communications, on the basis of the information items stored in the first list storage area 430*a*.

If the control unit 440 successfully detects the base station BS capable of carrying out communications, it ends the searching, registers a position of the mobile radio terminal 400 by the base station BS and stands by the incoming call. On the other hand, if the control unit 440 fails to detect the base station BS capable of carrying out communications, it proceeds to step 14*b*.

In step 14*b*, the control unit 440 executes searching for the base station BS capable of carrying out communications, by employing the second searching means 440*b*. The second searching means 440*b* thereby controls the receive frequencies of the transmitting-receiving unit 410 and searches for the base station BS capable of carrying out communications, on the basis of the information items stored in the second list storage area 430*b*.

If the control unit 440 successfully detects the base station BS capable of carrying out communications, it ends the searching, registers a position of the mobile radio terminal 400 by the base station BS and stands by the incoming call. In addition, the control unit 440 stores identification information of the detected base station BS in the first list storage area 430*a*. On the other hand, if the control unit 440 fails to detect the base station BS capable of carrying out communications, it stops the units which are started up such as the transmitting-receiving unit 410 (SLEEP) and proceeds to step 14*c*.

In step 14*c*, the control unit 440 sets 10 [s] as the first search cycle T_List1. In addition, the control unit 440 sets a value corresponding to the search counter Cs stored in the storage unit 430 as the second search cycle T_List2, by referring to the search cycle table stored in the search cycle table storage area 430*c*. As the second search cycle T_List2, 3 [min] are set here since the search counter Cs is "0".

In step 14*d*, the control unit 440 starts up timer T1 and timer T2 such that each of the timers starts measuring the time. The control unit 440 proceeds to step 14*e*.

In step 14*e*, the control unit 440 discriminates whether the value of the timer T1 has passed the first search cycle T_List1. If the value of the timer T1 has passed the first search cycle T_List1, the control unit 440 proceeds to step 14*f*. If the value of the timer T1 has not passed the first search cycle T_List1, the control unit 440 proceeds to step 14*h*.

In step 14*f*, the control unit 440 starts up necessary units such as the transmitting-receiving unit 410 (WAKE-UP) and executes searching for the base station BS capable of carrying out communications, by employing the first searching means 440*a*. The first searching means 440*a* thereby controls the receive frequencies of the transmitting-receiving unit 410 and searches for the base station BS capable of carrying out communications, on the basis of the information items stored in the first list storage area 430*a*.

If the control unit 440 successfully detects the base station BS capable of carrying out communications, it ends the searching, registers a position of the mobile radio terminal 400 by the base station BS and stands by the incoming call. On the other hand, if the control unit 440 fails to detect the base station BS capable of carrying out communications, it stops the units which are started up such as the transmitting-receiving unit 410 (SLEEP) and proceeds to step 14*g*.

The control unit 440 restarts the timer T1 in step 14*g* and proceeds to step 14*h*.

In step 14*h*, the control unit 440 discriminates whether the value of the timer T2 has passed the second search cycle T_List2 or whether the indication detection flag F is "1". If the value of the timer T2 has passed the second search cycle T_List2 or if the indication detection flag F is "1", the control unit 440 proceeds to step 14*i*. If the value of the timer T2 has not passed the second search cycle T_List2 and the indication detection flag F is "0", the control unit 440 proceeds to step 14*e*.

In step 14*i*, the control unit 440 starts up necessary units such as the transmitting-receiving unit 410 (WAKE-UP) and executes searching for the base station BS capable of carrying out communications, by employing the second searching means 440*b*. The second searching means 440*b* thereby controls the receive frequencies of the transmitting-receiving unit 410 and searches for the base station BS capable of carrying out communications, on the basis of the information items stored in the second list storage area 430*b*.

If the control unit 440 successfully detects the base station BS capable of carrying out communications, it ends the searching, registers a position of the mobile radio terminal 400 by the base station BS and stands by the incoming call. In addition, the control unit 440 stores identification information of the detected base station BS in the first list storage area 430*a*. On the other hand, if the control unit 440 fails to detect the base station BS capable of carrying out communications, it stops the units which are started up such as the transmitting-receiving unit 410 (SLEEP) and proceeds to step 14*j*.

In step 14*j*, the control unit 440 discriminates whether the indication detection flag F is "1". If the indication detection flag F is "1", the control unit 440 proceeds to step 14k. If the indication detection flag F is "0", the control unit 440 proceeds to step 14l.

In step 14k, the control unit 440 resets the search counter Cs and the indication detection flag F at "0" and proceeds to step 14m.

On the other hand, the control unit 440 updates the value of the search counter Cs stored in the storage unit 430 by adding "1" to the value of the search counter Cs, in step 14l, and proceeds to step 14m.

In step 14m, the control unit 440 sets a value corresponding to the search counter Cs stored in the storage unit 430 as the second search cycle T_List2, by referring to the search cycle table stored in the search cycle table storage area 430c.

In addition, the control unit 440 restarts the timer T2 and proceeds to step 14e. A search cycle corresponding to the number of searches Cs of the base station BS based on the information items stored in the second list storage area 430b is thereby set as the second search cycle T_List2.

Figure 15:
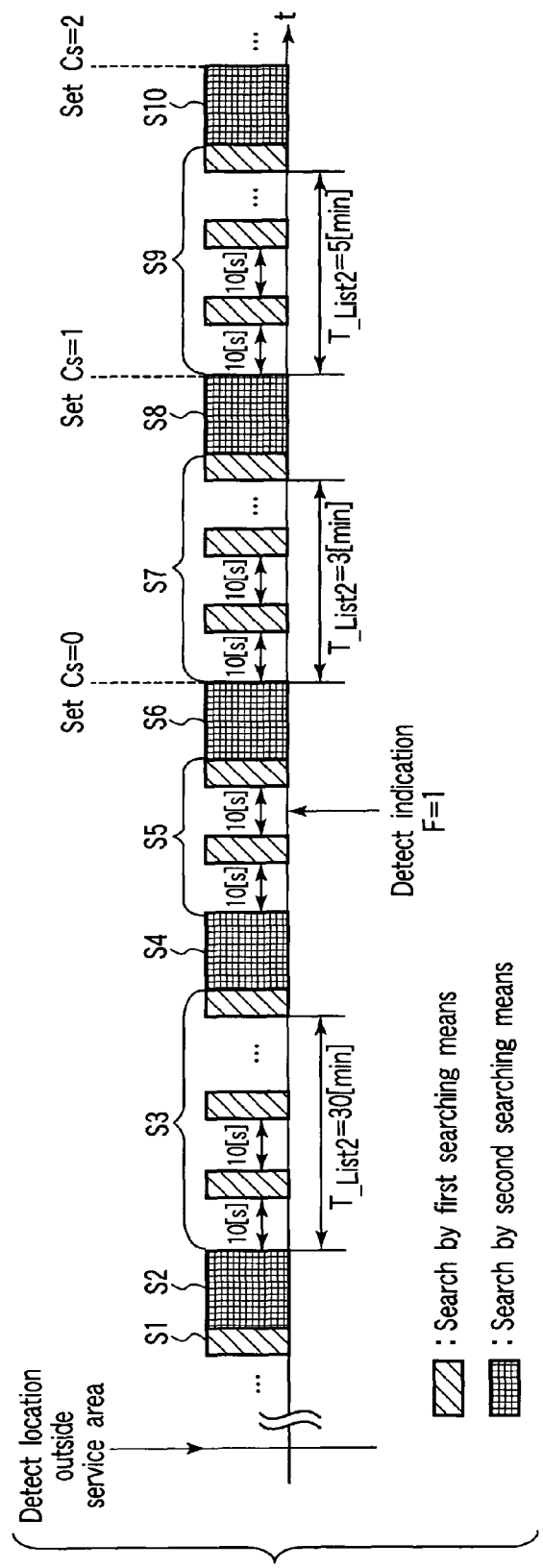
FIG. 15 is an illustration showing the operation of searching for the base station which can carry out communications, by the mobile radio terminal shown in FIG. 13.
Figure 17:
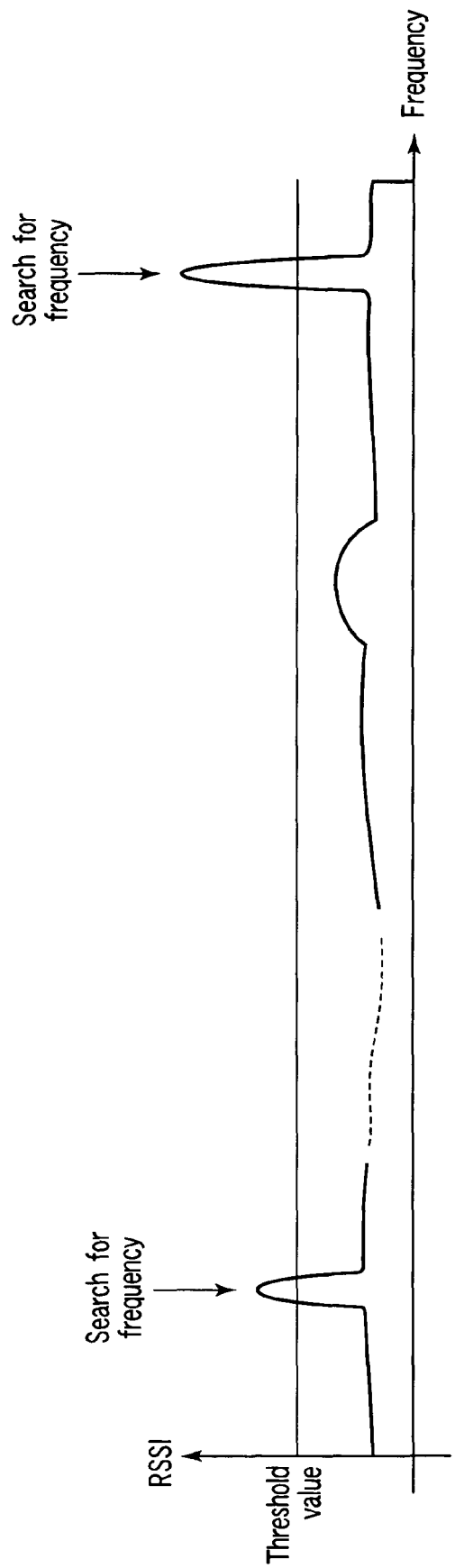
FIG. 17 is an illustration showing a processing of narrowing frequencies subjected to searching on the basis of RSSI.

Next, variation in the cycle of searching the base station BS by the control operation of the base station search is described. FIG. 15 is an illustration showing the variation in the search cycle. If the base station BS is detected, the processing of searching is ended. Therefore, FIG. 15 illustrates a case where a condition of failing to detect the base station BS is continued, for clear explanation.

In addition, in the case of FIG. 15, the condition of failing to detect the base station BS is continued, the search S1 of the first searching means 440a and the search S2 of the second searching means 440b are repeated, and 30 [min] are set as the second search cycle T_List2.

When the search S2 of the second searching means 440b is ended, search S3 (step 14f) of the first searching means 440a is repeated for every first search cycle T_List1 (=1 [s]).

When the second search cycle T_List2 (=30 [min]) elapses after the search S2 of the second searching means 440b is ended, search S4 (step 14i) of the second searching means 440b is executed.

When the search S4 of the second searching means 440b is ended, search S5 (step 14f) of the first searching means 440a is repeated for every first search cycle T_List1 (=10 [s]).

During this period, if the indication detecting unit 450 detects the indication of the user operation, the detection of the indication is notified to the control unit 440 and the indication detection flag F is set at "1".

In step 14h, search S6 (step 14i) of the second searching means 440b is executed since the indication detection flag F is set at "1".

When the search S6 of the second searching means 440b is ended, the search counter Cs is reset at "0" (step 14k), the second search cycle T_List2 is set at 3 [min] on the basis of the search counter Cs (=[0]) (step 14m), and search S7 (step 14f) of the first searching means 440a is repeated for every first search cycle T_List1 (=10 [s]).

When the second search cycle T_List2 (=3 [min]) elapses after the search S6 of the second searching means 440b is ended, search S8 (step 14i) of the second searching means 440b is executed.

When the search S8 of the second searching means 440b is ended, "1" is added to the search counter Cs (step 14l), and the second search cycle T_List2 is set at 5 [min] on the basis of the search counter Cs (=[1]) (step 14m).

After that, search S9 (step 14f) of the first searching means 440a is repeated for every first search cycle T_List1 (=10 [s]). When the second search cycle T_List2 (=5 [min]) elapses after the search S8 of the second searching means 440b is ended, search S10 (step 14i) of the second searching means 440b is executed.

As described above, if the control unit 440 detects that the mobile radio terminal 400 having the above-described structure is located outside the service area, searching for the base station BS on the basis of the information items stored in the first list storage area 430a is executed in a certain cycle and searching for the base station BS on the basis of the information items stored in the second list storage area 430b is executed in accordance with the number of times Cs of searching for the base station BS, in a gradually extended cycle.

These steps are based on the fact that as the mobile radio terminal 400 is located outside the service area for a longer time, probability of its location within the service area is lowered. In other words, searching for the base station BS is executed with high frequency at the initial time of detecting that the mobile radio terminal 400 is located outside the service area. As the time elapses, searching for the base station BS is executed with low frequency.

Therefore, according to the mobile radio terminal 400, the base station BS capable of carrying out communications can be easily detected at the initial time when the mobile radio terminal 400 is located outside the service area. Since the power consumed to search for the base station BS can be reduced as the time elapses, searching can be executed with great efficiency.

In addition, if the indication detecting unit 450 detects the indication of the user operation after detecting that the mobile radio terminal 400 is located outside the service area, searching for the base station BS is executed on the basis of the information items stored in the second list storage area 430b.

Therefore, even if the mobile radio terminal 400 is located outside the service area for a long time and the cycle T_List2 of searching for the base station BS on the basis of the information items stored in the second list storage area 430b becomes longer, searching for the base station BS is immediately executed on the basis of the information items stored in the second list storage area 430b, in accordance with the indication of the user operation.

For this reason, since searching for the base station BS capable of carrying out communications is executed by only conducting an action (for example, touching or lifting the mobile radio terminal 400) which urges the indication detecting unit 450 to detect the indication, the user can quickly carry out communications.

Furthermore, if the indication detecting unit 450 detects the indication (for example, touching or lifting the mobile radio terminal 400) of the user operation after detecting that the mobile radio terminal 400 is located outside the service area, the cycle T_List2 of searching for the base station BS on the basis of the information items stored in the second list storage area 430b, is set to be short.

Therefore, since the search cycle T_List2 is set to be short by only conducting an action (for example, touching or lifting the mobile radio terminal 400) which urges the indication detecting unit 450 to detect the indication, supplement to the system can be easily executed and the user can quickly carry out communications.

In the fourth embodiment, the indication detecting unit 450 is applied to the first embodiment. However, the indication detecting unit 450 can also be applied to the second embodiment or the third embodiment. The application to the second embodiment or the third embodiment can be implemented by resetting the elapsing time Te after the mobile radio terminal moves out of the service area, instead of resetting the value of the search counter Cs.

In addition, in the first to fourth embodiments, the first searching means 140a, 240a, 340a or 440a and the second searching means 140b, 240b, 340b or 440b search for the base station BS capable of carrying out communications irrespective of distinction of the W-CDMA system and the GSM system.

Instead of this, for example, selecting the communication scheme may be preliminarily accepted from the user through a key input unit (not shown) or the like and searching for the base station BS may be conducted selectively in the W-CDMA system alone, the GSM system alone, or both the W-CDMA system and the GSM system.

FIG. 16(a) illustrates searching for the base station BS in the W-CDMA system alone, by the first searching means 140a, 240a, 340a or 440a and the second searching means 140b, 240b, 340b or 440b. FIG. 16(b) illustrates searching for the base station BS in the GSM system alone, by the first searching means 140a, 240a, 340a or 440a and the second searching means 140b, 240b, 340b or 440b. FIG. 16(c) illustrates searching for the base station BS in both the W-CDMA system and the GSM system, by the first searching means 140a, 240a, 340a or 440a and the second searching means 140b, 240b, 340b or 440b.

In the first searching means 140a, 240a, 340a and 440a, the information items to identify frequencies corresponding to a channel which has been employed for an incoming call standby and a channel which has been employed for communications, are stored for the W-CDMA system and the GSM system, separately. These information items are updated by the control units 140, 240, 340 and 440 in accordance with their use.

In the second searching means 140b, 240b, 340b and 440b, the information items to identify all of the frequencies with which the mobile radio terminal 100 can carry out communications, are stored for the W-CDMA system and the GSM system, separately.

Moreover, in the first to fourth embodiments, searching for the base station BS is conducted by variably controlling the receive frequencies of the transmitting-receiving units 110, 210, 310 and 410 and detecting the pilot signal transmitted from the base station BS over a predetermined channel.

In addition to this, for example, the control units 140, 240, 340 and 440 may variably control the receive frequencies of the transmitting-receiving units 110, 210, 310 and 410, detect a frequency whose RSSI (Received Signal Strength Indicator) level exceeds a threshold value th and narrow down the frequencies.

The first searching means 140a, 240a, 340a and 440a, and the second searching means 140b, 240b, 340b and 440b detect the pilot signal, in accordance with the narrowed frequencies alone, to search for the base station BS.

By conducting the processing of narrowing the frequencies prior to the detection of the pilot signal, the base station BS capable of carrying out communications can be efficiently detected and the signal processing caused by the detection of the pilot signal can be reduced. The consumed power can be thereby reduced.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal comprising:
a first storing section which stores identification information of a plurality of radio base stations;
a second storing section which stores identification information of radio base stations with which the mobile radio terminal has carried out communications, the identification information stored by the second storing section being included in the identification information stored by the first storing section;
a receiving section which is adapted to receive a radio signal transmitted from a radio base station;
a detecting section which detects, based on a reception result of the receiving section, whether the mobile radio terminal has failed to carry out communications with a radio base station;
a searching section which, when the detection section detects that the mobile radio terminal has failed to carry out communications with a radio base station, carries out a search for a radio base station capable of carrying out communications with the mobile radio terminal, wherein the search comprises: (i) controlling the receiving section based on the identification information stored in the first storing section to conduct a first search for a radio base station capable of carrying out communications with the mobile radio terminal each time that a first search cycle elapses, and (ii) controlling the receiving section based on the identification information stored in the second storing section to conduct a second search for a radio base station capable of carrying out communications with the mobile radio terminal from among the radio base stations with which the mobile radio terminal has carried out communications, each time that a second search cycle elapses; and
a search cycle varying section which gradually increases, in response to the detection section detecting that the mobile radio terminal has moved outside a service area, a length of the first search cycle as a length of the search carried out by the searching section increases, and which independently and gradually increases a length of the second search cycle as the length of the search carried out by the searching section increases, wherein the search cycle varying section sets the second search cycle to be shorter than the first search cycle so that the second search is conducted a plurality of times within the first search cycle.

2. The mobile radio terminal according to claim 1, wherein the length of the search carried out by the searching section is measured in a number of times that the first search cycle has elapsed; and
wherein the search cycle varying section increases the length of the first search cycle as the number of times that the first search cycle has elapsed increases.

3. The mobile radio terminal according to claim 1, wherein the length of the search carried out by the searching section is measured by a length of time that has elapsed from a time at which the detection section detects that the mobile radio terminal has failed to carry out communications with a radio base station; and
    wherein the search cycle varying section increases the length of the first search cycle as the length of the elapsed time increases.

4. The mobile radio terminal according to claim 1, further comprising a level detecting section which detects a frequency of a high receive power level, in the reception result of the receiving section;
    wherein the searching section carries out a search for the radio base station capable of carrying out communications with the mobile radio terminal, from among radio base stations corresponding to the frequency detected by the level detecting section, among the radio base stations with which the mobile radio terminal has carried out communications corresponding to the identification information stored by the second storing section.

5. The mobile radio terminal according to claim 1, wherein the length of the search carried out by the searching section is measured by a length of time that has elapsed from a time at which the detection section detects that the mobile radio terminal has failed to carry out communications with a radio base station; and
    wherein the search cycle varying section increases the length of the first search cycle and the length of the second search cycle as the length of the elapsed time increases.

6. The mobile radio terminal according to claim 1, further comprising an indication detecting section which detects use of the mobile radio terminal by a user;
    wherein when the indication detecting section detects use of the mobile radio terminal by the user after the detection section detects that the mobile radio terminal has failed to carry out communications with a radio base station, the searching section controls the receiving section to search for a radio base station capable of carrying out communications with the mobile radio terminal, without waiting for the first search cycle to elapse.

7. The mobile radio terminal according to claim 6, wherein when in response to the indication detecting section detecting use of the mobile radio terminal the searching section controls the receiving section to search for a radio base station capable of carrying out communications with the mobile radio terminal without waiting for the first search cycle to elapse, the search cycle varying section resets the length of the first search cycle to an initial length.

8. The mobile radio terminal according to claim 1, wherein the mobile radio terminal is capable of carrying out communication in both a W-CDMA system and a GSM system, and wherein the searching section selectively controls the receiving section to search in one of: (i) the W-CDMA system only, (ii) the GSM system only, and (iii) both the W-CDMA system and the GSM system.

9. A method of controlling a mobile radio terminal, wherein the mobile radio terminal comprises a receiving section which is adapted to receive a radio signal transmitted from a radio base station, a first storing section which stores identification information of a plurality of radio base stations, and a second storing section which stores identification information of radio base stations with which the mobile radio terminal has carried out communications, the identification information stored by the second storing section being included in the identification information stored by the first storing section, the method comprising:
    detecting, based on a reception result of the receiving section, whether the mobile radio terminal has failed to carry out communications with a radio base station;
    carrying out, if it is detected that the mobile radio terminal has failed to carry out communications with a radio base station, a searching process of searching for a radio base station capable of carrying out communications with the mobile radio terminal, wherein the searching process comprises: (i) controlling the receiving section based on the identification information stored in the first storing section to conduct a first search for a radio base station capable of carrying out communications with the mobile radio terminal, each time that a first search cycle elapses, and (ii) controlling the receiving section based on the identification information stored in the second storing section to conduct a second search for a radio base station capable of carrying out communications with the mobile radio terminal from among the radio base stations with which the mobile radio terminal has carried out communications, each time that a second search cycle elapses; and
    gradually increasing, in response to detecting that the mobile radio terminal has moved outside a service area, a length of the first search cycle as a length of the searching process increases, and independently and gradually increasing a length of the second search cycle as the length of the searching process increases, wherein the second search cycle is set to be shorter than the first search cycle so that the second search is conducted a plurality of times within the first search cycle.

10. The method according to claim 9, wherein the length of the searching process is measured in a number of times that the first search cycle has elapsed; and
    wherein the length of the first search cycle is increased as the number of times that the first search cycle has elapsed increases.

11. The method according to claim 9, wherein the length of the searching process is measured by a length of time that has elapsed from a time at which it is detected that the mobile radio terminal has failed to carry out communications with a radio base station; and
    wherein the length of the first search cycle is increased as the length of the elapsed time increases.

12. The method according to claim 9, further comprising:
    detecting a frequency of a high receive power level, in the reception result of the receiving section;
    wherein the searching process comprises carrying out a search for the radio base station capable of carrying out communications with the mobile radio terminal, from among radio base stations corresponding to the frequency detected by the level detecting section, among the radio base stations with which the mobile radio terminal has carried out communications corresponding to the identification information stored by the second storing section.

13. The method according to claim 9, wherein the length of the searching process is measured by a length of time that has elapsed from a time at which it is detected that the mobile radio terminal has failed to carry out communications with a radio base station; and
    wherein the length of the first search cycle and the length of the second search cycle are increased as the length of the elapsed time increases.

14. The method according to claim 9, further comprising detecting use of the mobile radio terminal by a user;
    wherein in the searching process, when the indication detecting section detects use of the mobile radio terminal by the user, the receiving section is controlled to search for a radio base station capable of carrying out communications with the mobile radio terminal, without waiting for the first search cycle to elapse.

15. The method according to claim 14, wherein when in response to the detection of use of the mobile radio terminal the receiving section is controlled to search for a radio base station capable of carrying out communications with the mobile radio terminal without waiting for the first search cycle to elapse, the length of the first search cycle is reset to an initial length.

16. The method according to claim 9, wherein the mobile radio terminal is capable of carrying out communication in both a W-CDMA system and a GSM system, and wherein the receiving section is selectively controlled to search in one of: (i) the W-CDMA system only, (ii) the GSM system only, and (iii) both the W-CDMA system and the GSM system.

* * * * *